US007593961B2

(12) United States Patent
Eguchi et al.

(10) Patent No.: US 7,593,961 B2
(45) Date of Patent: Sep. 22, 2009

(54) INFORMATION PROCESSING APPARATUS FOR RETRIEVING IMAGE DATA SIMILAR TO AN ENTERED IMAGE

(75) Inventors: Takami Eguchi, Tokyo (JP); Mitsuru Uzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 10/828,166

(22) Filed: Apr. 21, 2004

(65) Prior Publication Data
US 2004/0220898 A1    Nov. 4, 2004

(30) Foreign Application Priority Data
Apr. 30, 2003  (JP)  ............................ 2003-125816
Mar. 10, 2004  (JP)  ............................ 2004-067779

(51) Int. Cl.
*G06F 7/00* (2006.01)
(52) U.S. Cl. ..................... 707/104.1; 707/1; 358/400; 382/173; 382/232; 382/276; 382/305
(58) Field of Classification Search ................ 707/104, 707/1–6, 100–102; 382/22, 225, 248, 305; 235/436; 395/600; 705/67
See application file for complete search history.

(56) References Cited

U.S. PATENT DOCUMENTS

| 4,937,761 A | * | 6/1990 | Hassett ....................... 345/468 |
| 5,347,368 A | * | 9/1994 | Mochizuki ................... 358/296 |
| 5,388,166 A | * | 2/1995 | Onozawa ..................... 382/269 |
| 5,452,356 A | * | 9/1995 | Albert ......................... 380/271 |
| 5,493,677 A | * | 2/1996 | Balogh et al. ............. 707/104.1 |
| 5,568,568 A | * | 10/1996 | Takizawa et al. ............. 382/220 |
| 5,680,478 A |   | 10/1997 | Wang et al. .................. 382/176 |
| 5,821,929 A | * | 10/1998 | Shimizu et al. ............... 382/190 |
| 5,852,710 A | * | 12/1998 | Shiohara et al. ............ 358/1.16 |
| 5,862,257 A | * | 1/1999 | Sekine et al. ................ 382/199 |

(Continued)

FOREIGN PATENT DOCUMENTS

EP        0 924 639 A2        6/1999

(Continued)

OTHER PUBLICATIONS

Tomaiuolo, When Image is Everything, Jan. 2002, Serials Solutions, vol. 10, No. 1 www.infotoday.com/searcher/jan02/tomaiuolo.htm.*

(Continued)

*Primary Examiner*—Apu M Mofiz
*Assistant Examiner*—Jessica N Le
(74) *Attorney, Agent, or Firm*—Fitzpatrick, Cella, Harper & Scinto

(57) ABSTRACT

More accurate retrieval of original documents is conducted by adaptively evaluating retrieval results, which are obtained by retrieving attributes, in accordance with layout information. To achieve this, there is provided an information processing method for retrieving image data that is similar to an entered document image, the method including a step (S402) of segmenting the entered document image into a plurality of areas on a per-attribute basis; a step of calculating degree of similarity, for every area obtained by segmentation, using a retrieval step suited to the attribute; and a step (S406) of calculating overall degree of similarity in which the degree of similarity calculated for every area obtained by segmentation is weighted.

25 Claims, 19 Drawing Sheets

U.S. PATENT DOCUMENTS

| | | | | |
|---|---|---|---|---|
| 5,915,250 | A * | 6/1999 | Jain et al. | 707/100 |
| 5,943,443 | A * | 8/1999 | Itonori et al. | 382/225 |
| 5,949,555 | A * | 9/1999 | Sakai et al. | 358/462 |
| 5,987,171 | A * | 11/1999 | Wang | 382/173 |
| 5,991,466 | A | 11/1999 | Ushiro et al. | 382/305 |
| 5,999,664 | A | 12/1999 | Mahoney et al. | 382/305 |
| 6,002,809 | A * | 12/1999 | Feig et al. | 382/298 |
| 6,038,343 | A * | 3/2000 | Shimizu et al. | 382/187 |
| 6,130,962 | A * | 10/2000 | Sakurai | 382/190 |
| 6,397,213 | B1 | 5/2002 | Cullen et al. | 707/5 |
| 6,463,432 | B1 * | 10/2002 | Murakawa | 707/5 |
| 6,466,329 | B1 | 10/2002 | Mukai | 358/1.15 |
| 6,519,360 | B1 | 2/2003 | Tanaka | 382/162 |
| 6,622,139 | B1 * | 9/2003 | Nakayama et al. | 707/3 |
| 6,704,729 | B1 * | 3/2004 | Klein et al. | 707/5 |
| 6,728,406 | B1 * | 4/2004 | Murao | 382/191 |
| 6,789,113 | B1 * | 9/2004 | Tanaka | 709/223 |
| 6,826,316 | B2 * | 11/2004 | Luo et al. | 382/305 |
| 6,870,962 | B2 * | 3/2005 | Lee et al. | 382/248 |
| 6,948,657 | B2 * | 9/2005 | Sugino et al. | 235/436 |
| 6,970,601 | B1 | 11/2005 | Kaneda et al. | 382/209 |
| 7,043,474 | B2 * | 5/2006 | Mojsilovic et al. | 707/6 |
| 7,058,230 | B2 * | 6/2006 | Chiba et al. | 382/243 |
| 7,089,420 | B1 * | 8/2006 | Durst et al. | 713/176 |
| 7,103,237 | B2 * | 9/2006 | Labelle | 382/305 |
| 7,106,470 | B2 * | 9/2006 | Parry | 358/1.15 |
| 7,120,861 | B1 * | 10/2006 | Marukawa | 715/501.1 |
| 7,181,127 | B2 * | 2/2007 | Nagasaka et al. | 386/69 |
| 7,206,779 | B2 * | 4/2007 | Furuhashi et al. | 707/5 |
| 7,248,782 | B2 * | 7/2007 | Kasutani | 386/69 |
| 7,370,034 | B2 * | 5/2008 | Franciosa et al. | 707/3 |
| 2001/0003182 | A1 * | 6/2001 | Labelle | 707/3 |
| 2001/0019628 | A1 * | 9/2001 | Fujimoto et al. | 382/225 |
| 2001/0042068 | A1 * | 11/2001 | Yoshida et al. | 707/102 |
| 2001/0042083 | A1 * | 11/2001 | Saito et al. | 707/517 |
| 2002/0052872 | A1 * | 5/2002 | Yada | 707/6 |
| 2002/0131641 | A1 * | 9/2002 | Luo et al. | 382/218 |
| 2002/0184186 | A1 * | 12/2002 | Imaichi et al. | 707/1 |
| 2003/0037010 | A1 * | 2/2003 | Schmelzer | 705/67 |
| 2003/0044062 | A1 * | 3/2003 | Ganapathy et al. | 382/165 |
| 2003/0046268 | A1 * | 3/2003 | Hirabayashi | 707/1 |
| 2003/0065658 | A1 * | 4/2003 | Matsubayashi et al. | 707/4 |
| 2003/0095723 | A1 * | 5/2003 | Ishizaka et al. | 382/298 |
| 2003/0182296 | A1 * | 9/2003 | Sato et al. | 707/100 |
| 2003/0195883 | A1 * | 10/2003 | Mojsilovic et al. | 707/6 |
| 2004/0006736 | A1 * | 1/2004 | Kawatani | 715/500 |
| 2004/0145593 | A1 * | 7/2004 | Berkner et al. | 345/619 |
| 2005/0223031 | A1 * | 10/2005 | Zisserman et al. | 707/104.1 |
| 2005/0228797 | A1 * | 10/2005 | Koningstein et al. | 707/100 |
| 2005/0248561 | A1 * | 11/2005 | Ito et al. | 345/419 |

FOREIGN PATENT DOCUMENTS

| | | |
|---|---|---|
| JP | 3-17851 | 3/1991 |
| JP | 9-22414 | 1/1997 |
| JP | 10-285378 | 10/1998 |
| JP | 11-96364 | 4/1999 |
| JP | 3017851 | 12/1999 |
| JP | 2000-76339 | 3/2000 |
| JP | 2000-148793 | 5/2000 |
| JP | 2001-76095 | 3/2001 |
| JP | 2001-229186 | 8/2001 |
| JP | 2001-283220 | 10/2001 |
| JP | 2001-319231 | 11/2001 |
| WO | WO 00/49526 | 8/2000 |

OTHER PUBLICATIONS

Lazzerini et al., Feature selection based on similarity, Jan 31, 2002, IEEE, vol. 38, Issue 3, pp. 121-122.*

Yoon, Vicarious Certification and Billing Agent for Web Information Service, Jan 21-23, 1998, IEEE, pp. 344-349.*

Petraglia et al., Virtual Images for Similarity Retrieval in Image Databases, Nov.-Dec. 2001, IEEE, vol. 13, Issue 6, pp. 951-967.*

Avula et al., Image Retrieval Using Segmentation, Apr. 24-25, 2003, IEEE, pp. 289-294.*

Doermann, D., et al. "The Development of a General Framework for Intelligent Document Image Retrieval," Internet Publication, Aug. 1996, retrieved from http://citeseer.ist.psu.edu/doermann96development.html.

Herrmann, P., et al., "Retrieval of Document Images Using Layout Knowledge,", 1993 Proceedings of the Second Internatinal Conference on Document Analysis and Recognition, Tsukuba Science City, Japan, Oct. 20-22, 1993, Los Alamitos, CA, USA, IEEE Comput. Soc., pp. 537-540.

Japanese Official Action dated Sep. 22, 2008, regarding Application No. 2004-067779.

Japanese Office Communication dated Jan. 16, 2009, regarding Japanese Application No. 2004-067779.

* cited by examiner

INFORMATION PROCESSING APPARATUS FOR RETRIEVING IMAGE DATA SIMILAR TO AN ENTERED IMAGE

FIELD OF THE INVENTION

This invention relates to a retrieval technique whereby image data that resembles an image read by an input device such as a scanner is retrieved from a database.

BACKGROUND OF THE INVENTION

At a time when there is much advocacy for environmental issues, rapid progress has been made in terms of achieving paperless systems in offices. One example proposed is an apparatus that uses a scanner to read paper documents or distribution material collected in a binder or the like and retrieve an electronic document of the original (e.g., see the specification of Japanese Patent No. 3017851).

However, since the above-described retrieval apparatus applies a technique based upon comparison with a bitmap to all images uniformly, retrieval efficiency and retrieval accuracy may decline depending upon the content of the document image. Accordingly, the applicant has given consideration to a document management system that employs a retrieval technique (referred to as "compound retrieval") in which when an original document is to be retrieved, first the feature of every attribute such as text, photograph or line art is calculated from the original document and the image that has been scanned in by the scanner, and then a plurality of degrees of matching are judged comprehensively, examples being degree of text matching, degree of photographic image matching, and degree of matching between layouts using layout information of each attribute.

The documents handled in such a document management system are multifarious and extend from documents having many text attributes to documents having many photograph and line-art attributes, and the layout (document content) differs greatly from document to document. With the above-described document management system, retrieval results for every attribute are evaluated uniformly when the comprehensive judgment is made. As a consequence, a problem which arises is that a satisfactory retrieval accuracy is not obtained in an environment that has a mixture of documents of widely different layouts. Further, in order to deal with redundant documents and enhance recycling of documents, not only is it necessary to make a comprehensive judgment concerning all documents but it is also required to conduct a search with regard to documents in which only portions thereof match. The need to conduct such a search for partial matching is pronounced even in situations where reference is made to photographs. For example, such a search is essential in a case where different authors are involved in the same document, such as an instance where it is necessary to collect a royalty suitably for separate portions of the document.

SUMMARY OF THE INVENTION

Accordingly, an object of the present invention is to implement a more accurate search of original documents by adaptively evaluating retrieval results for each attribute.

Another object of the present invention is to facilitate the handling of redundant data by conducting a search even with regard to documents in which there is only partial matching, and implement efficient document management.

According to the present invention, the foregoing objects are attained by providing an information processing apparatus for retrieving image data that is similar to an entered document image, comprising:

segmentation means for segmenting the entered document image into a plurality of areas on a per-attribute basis;

similarity calculation means for calculating degree of similarity, for every area obtained by segmentation, using retrieval means suited to the attribute; and overall-similarity calculation means for calculating overall degree of similarity in which the degree of similarity calculated for every area obtained by segmentation is weighted.

In accordance with the present invention, it is possible to implement a more accurate retrieval of original documents by adaptively evaluating retrieval results for each attribute.

Further, the handling of redundant data can be facilitated by conducting a search even with regard to documents in which there is only partial matching, and it is possible to perform efficient document management.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
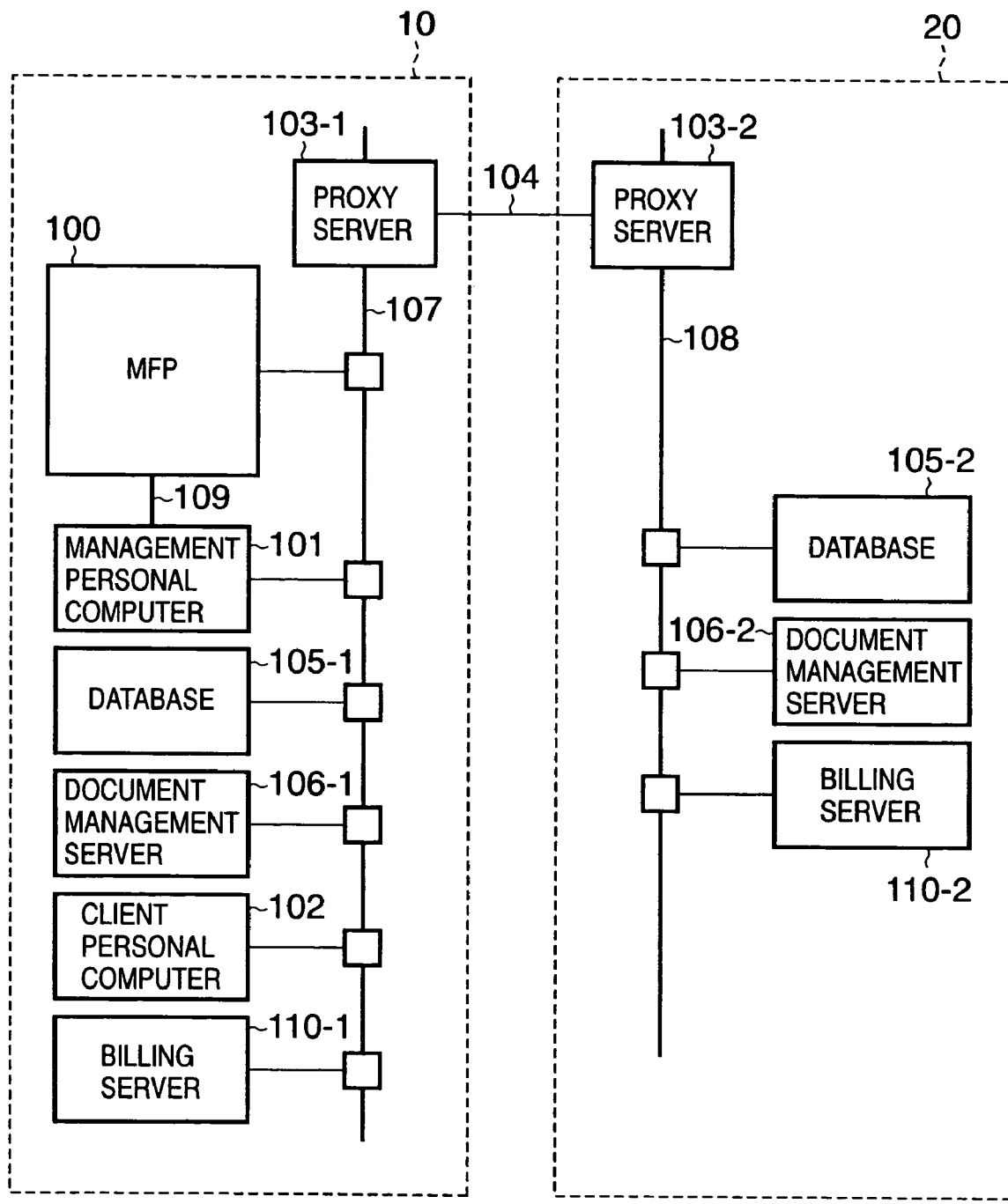
FIG. 1 is a diagram illustrating the configuration of an image processing system for implementing an information processing method according to the present invention.

A first embodiment of the present invention will now be described. FIG. 1 is a diagram illustrating the configuration of an image processing system for implementing an information processing method according to the present invention. As shown in FIG. 1, this embodiment assumes construction of an image processing system for implementing an information processing method in this invention in an environment in which offices 10 and 20 have been connected by the Internet 104.

A LAN 107 has been constructed in the office 10. Connected to the LAN 107 are an MFP 100, a management personal computer 101 for controlling the MFP 100, a client personal computer (having external storage means) 102-1, a document management server 106-1 and a database 105-1 thereof, a billing server 110 and a proxy server 103-1. Similarly, a LAN 108 has been constructed in the office 20. Connected to the LAN 108 are a document management server 106-2 and a database 105-2 thereof, and a billing server 110-2. The LAN 107 in office 10 and the LAN 108 in office 20 are connected to the Internet 104 via the proxy servers 103-1, 103-2.

In the image processing system having such a configuration, it is assumed that there is no particular limitation on storage locations of registered images that are the object of retrieval. Images may be stored in a storage device (described later) within the MFP 100, on a hard disk (not shown) within the management personal computer 101 and in a database (105-1) of the document management server 106-1. However, it is assumed that storage locations are externally accessible via the LAN 107 or 108 in such a manner that the registered images thus stored can be retrieved.

Further, it is assumed that the information processing method (retrieval function) according to the present invention can be implemented at any device in the image processing system shown in FIG. 1. For example, a data processor (described later) within the MFP 100 may have the retrieval function, the management personal computer 101 may have the retrieval function and the document management server 106-1 may have the retrieval function.

The MFP 100 takes charge of processing for reading images of paper documents and part of the image processing applied to the image signals that have been read. The image signals are input to the management personal computer 101 using the LAN 109. The management personal computer 101 is an ordinary personal computer that is provided internally with image storage means, image processing means, display means and input means, though some of these are an integral part of the MFP 100.

Figure 2:
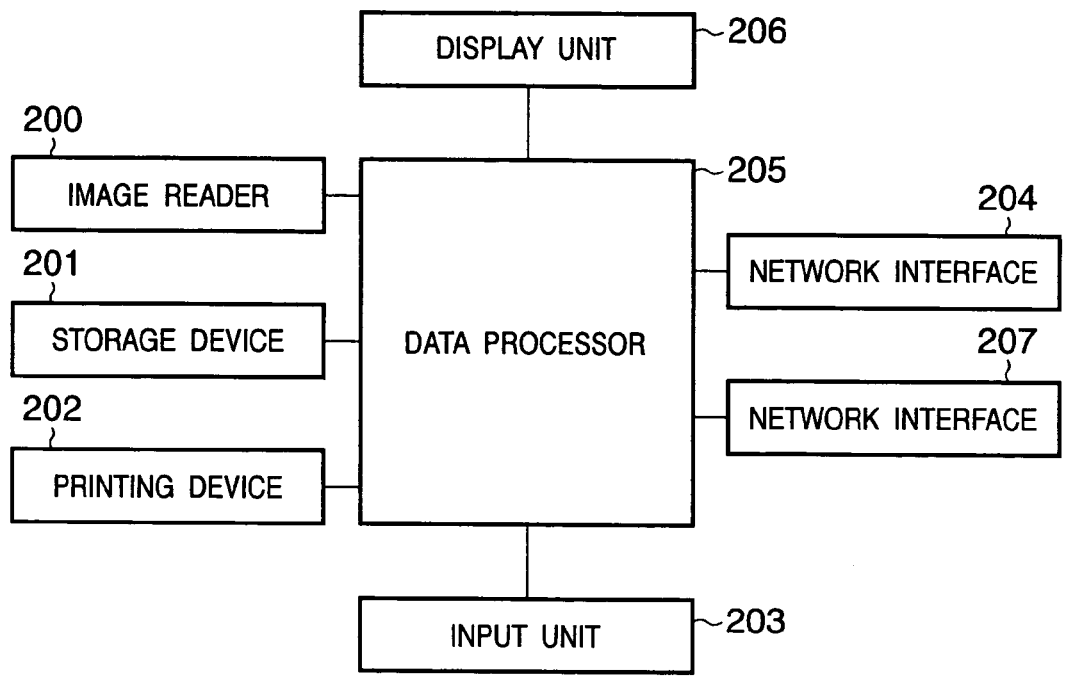
FIG. 2 is a block diagram of an MFP.

FIG. 2 is a block diagram of the MFP 100. As shown in FIG. 2, the MFP 100 has an image reader 200, which includes an automatic document feeder (referred to as an "ADF" below), for illuminating stacked paper documents or a single paper document by a light source (not shown), forming a reflected image of the document on a solid-state electronic image sensing device by a lens and obtaining a raster image signal from the solid-state electronic image sensing device as 600-dpi image information. In the case of ordinary copying processing, this image signal is converted to a print signal by a data processor 205. If a plurality of sheets are to be copied, then one page of print data is stored temporarily in a printing device 202, after which the data is output to the printing device 202 successively so that the image is printed on paper.

Print data transmitted from the client personal computer 102 via the LAN 107 and a network interface 204 is converted to printable raster data by the data processor 205, after which the print image represented by this data is formed on paper by the printing device 202. Commands from the operator to the MFP 100 are entered via a key control panel (input unit 203) with which the MFP 100 is equipped or via a keyboard and mouse of the management personal computer 101. This series of operations is controlled by a controller (not shown) within the data processor 205.

A display unit 206 presents a display showing the status of operational inputs and a display of image data that is undergoing processing. A storage device 201 also is controlled by the management personal computer 101. Exchange and control of data between the MFP 100 and management personal computer 101 are implemented via a network interface 207 and the directly connected LAN 109.

[Overview of Processing]

Figure 3:
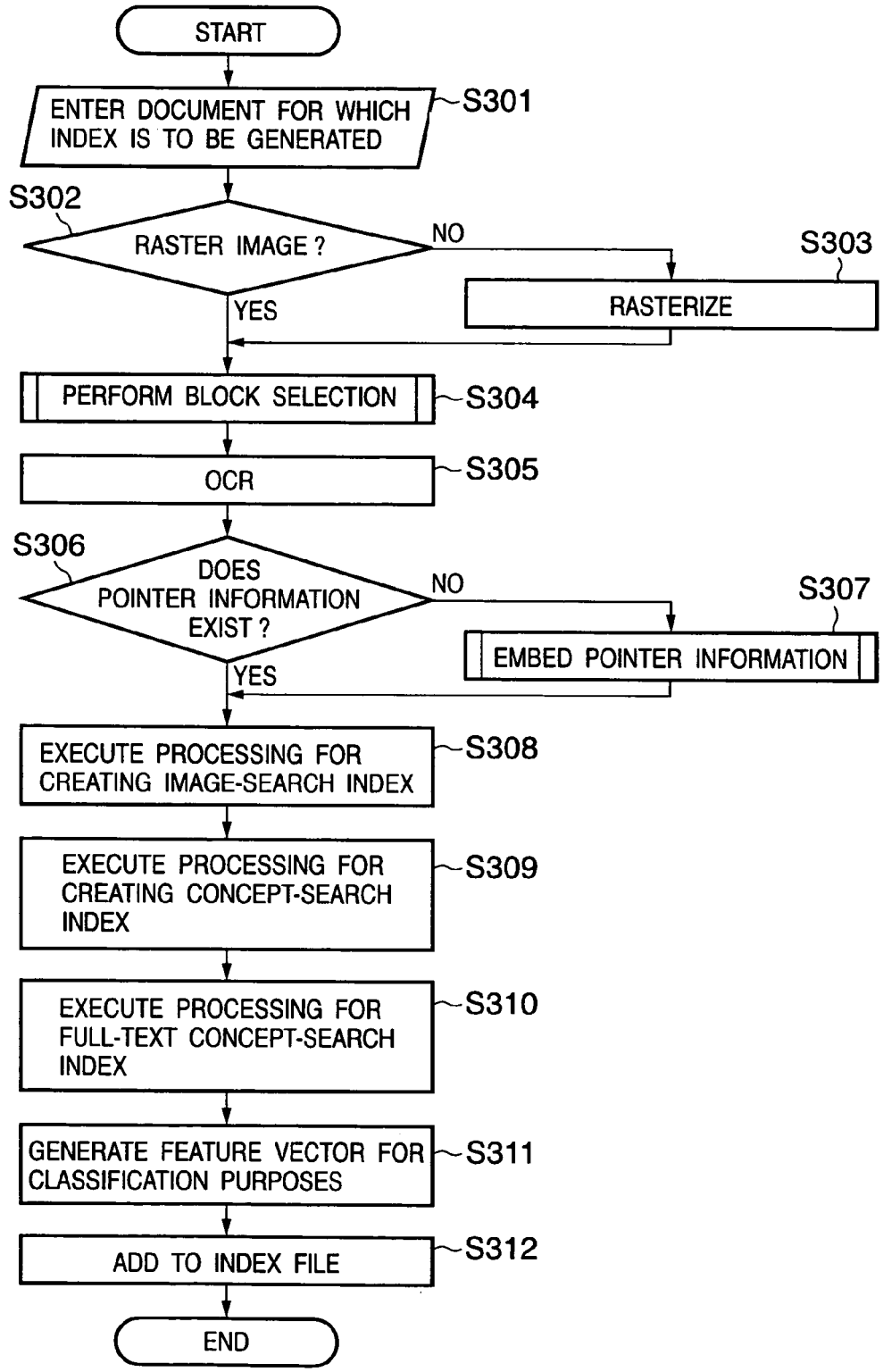
FIG. 3 is a flowchart illustrating the flow of processing for creating a search index.
Figure 4:
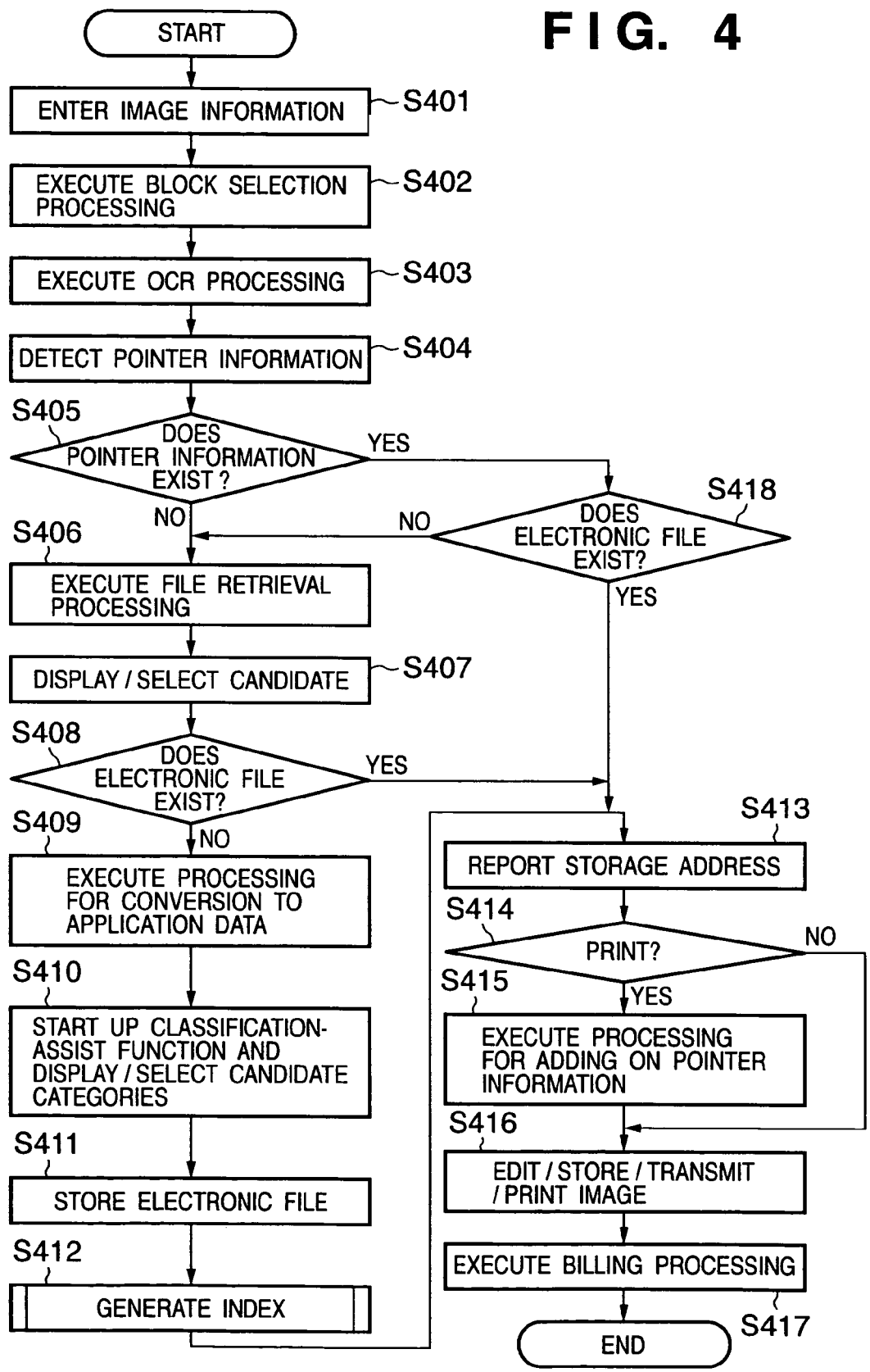
FIG. 4 is a flowchart illustrating the flow of similar-original retrieval processing and registration processing.

Next, reference will be had to FIGS. 3 and 4 to describe an overview of image processing that includes processing based upon the information processing method of the present invention in the image processing system shown in FIG. 1.

In order to simplify the description, it will be assumed that a database having registered images has been constructed on the hard disk (not shown) of the management personal computer and that the information processing method of the invention is implemented by operating the management personal computer 101 and MFP 100 together.

(Generation of Search Index)

FIG. 3 is a flowchart illustrating the flow of processing for generating an index for a file search. First, a document for which an index is to be generated is entered as an original (step S301). This original may be one obtained by entering printed matter from the image reader 200 and converting this to a bitmap (a bitmap image), electronic data created using a document editing application program, or electronic data based upon a format specific to an application program stored on the hard disk or a CD drive, DVD drive or FDD drive of the client personal computer 102. Furthermore, it is assumed that the original has been stored in a folder, which is classified by category, in a database. For example, document processing is facilitated by storing originals in separate folders classified by genre (category) such as a sports article, product pamphlet or business document.

In case of application data that is not a bitmap image ("NO" at step S302), control branches to step S303, where rasterizing is performed by the CPU in the management personal computer 101. Rasterizing is processing for analyzing application data and generating image data. This is processing executed widely when print images are generated.

Next, block selection (area segmentation processing) is carried out (step S304). Specifically, at step S304, areas are separated into text/line-art portions and halftone image portions, and the text portions are segmented by being further separated into blocks that are characters grouped on a paragraph basis or into tables or figures that are constructed of lines. The image portions expressed by halftones are segmented into so-called objects that are independent for each block, such as image portions and background portions of blocks separated into rectangles. Text blocks are subjected to OCR processing (step S305).

Next, an object applicable to a two-dimensional bar code or URL recorded as additional information is detected in the input image. By subjecting an URL to character recognition using OCR or subjecting a two-dimensional bar code to mark decoding, pointer information in the storage device storing the original electronic file of the document is detected (step S306). Another method based upon a so-called digital watermark that is not directly visible to the eye may be employed as means for adding on pointer information. Examples are a method of embedding information in the spaces between characters or embedding information in halftone images.

In a case where pointer information has not been detected at step S306, control branches to step S307, where pointer information is embedded by any of the methods mentioned above. However, the embedding of pointer information is not essential processing in retrieval processing.

Next, an index for an image search is generated from an object that has been segmented as an image portion (step S308). Here the feature of the image necessary for the image retrieval, e.g., the average color, is recorded. Further, a distribution of colors in the image also may be used as a feature.

Next, an index for a concept search is generated from an object that has been segmented as a text portion (step S309). A concept search, which will be described later, includes analyzing the meaning or context of entered text and finding documents related to this content. As a result, unlike ordinary searches, it becomes possible to retrieve documents even in a case where a definite keyword is not known. As for the text used in processing for creating a concept-search index, characters obtained by character recognition at step S305 are entered in a case where the original is bitmap data. In case of application data, text that has been stored in the application is entered.

Next, an index for a full-text search is generated (step S310). Text used in processing for creating an index for a full-text search is text similar to that used in the processing for creating the concept-search index.

Next, at step S311, the feature (frequency of appearance of a word, etc.) of each category is learned and a feature vector for classification purposes is generated. Specifically, this includes learning the features (frequency of appearance of a word, etc.) of documents for which indices are to be generated and which have been stored in category folders, and generating or updating the classification feature vector in each category folder. By thus previously extracting the feature of the folder in each category, recommended folder candidates serving as storage destinations can be presented at step S410 in FIG. 4 (described later) when an input image that has been vectorized at step S409 is stored at step S411, described later.

The index information that has been created is stored at step S312. The storage destination may be the databases 105-1, 105-2 within the document management servers 106-1, 106-2 connected to the LANs 107, 108 of offices 10 and 20, or the storage device 201 possessed by the MFP 100 per se. In this embodiment, however, it is assumed that the information is stored on the hard disk in management personal computer 101.

(Similar-Original Retrieval and Registration)

Next, similar-original retrieval processing and registration processing will be described with reference to FIG. 4. First, the image reader 200 of the MFP 100 in FIG. 2 is operated, a single document is raster-scanned and a 600-dpi, 24-bit image signal is obtained. The data processor 205 applies pre-processing to this image signal and stores the processed signal in the storage device 201 as one page's worth of image data (step S401). Alternatively, an original electronic file that has been accumulated as application data is rasterized to obtain a 600-dpi, 24-bit image signal, the data processor 205 applies pre-processing to this image signal and stores the processed signal in the storage device 201 as one page's worth of image data (step S401).

The CPU of the management personal computer 101 separates the stored image signal into text/line-art portions and halftone image portions and segments the text/line-art portions by further separating them into blocks that are characters grouped on a paragraph basis or into tables and figures that are constructed of lines. The management personal computer 101 segments the image portions expressed by halftones into objects that are independent for each block, such as image portions and background portions of blocks separated into rectangles (step S402).

Text blocks are subjected to OCR processing (step S403). At this time an object applicable to a two-dimensional bar code or URL recorded in the input image as additional information is detected. By subjecting an URL to character recognition using OCR or subjecting a two-dimensional bar code to mark decoding, pointer information in the storage device storing the original electronic file of the document is detected (step S404). Another method based upon a so-called digital watermark that is not directly visible to the eye may be employed as means for adding on pointer information. Examples are a method of embedding information in the spaces between characters or embedding information in halftone images.

In a case where pointer information has been detected ("YES" at step S405), control branches to step S418, where an original electronic file is retrieved from the address indicated by the pointer. In this embodiment, the original electronic file has been stored on the hard disk in the management personal computer 101. This hard disk is searched in accordance with the address information obtained at step S404. It should be noted that the storage location of the original electronic file is not limited to this hard disk. The storage destination may be the hard disk within the client personal computer 102 in FIG. 1, the databases 105-1, 105-2 within the document management servers 106-1, 106-2 connected to the LANs 107, 108 of offices 10 and 20, or the storage device 201 possessed by the MFP 100 per se. If an original electronic file is not found at step S418, or if the file is found but is a so-called image file typified by a PDF or tiff, or if pointer information itself does not exist ("NO" at step S405), then control branches to step S406.

At step S406, original electronic files in the database are searched. To accomplish this, first the text block obtained by OCR at step S403 is segmented into words and keywords are extracted. Extraction of keywords is a function for analyzing a text portion and extracting a determined number of words that have been decided to be keywords based upon the frequency of appearance of the words. The keywords are entered as a search key for a full-text search. Further, text is extracted from the text block and a summary is generated utilizing a property such as the fact that beginning part of the text relates to a description of the entire document. The summary text generated is entered as a search key for the concept search. Furthermore, an image search is conducted with regard to image blocks treating them as separate image files on the assumption that they are image data. Next, degree of similarity is investigated with regard to each original electronic file in the database to thereby conduct a search of original electronic files. The present invention is characterized by finding degree of similarity object by object and causing the degree of similarity per object to be reflected in the degree of similarity of the overall file in accordance with the share of the object in the file. In other words, by causing the degree of similarity of an object that occupies a large proportion of a file to be reflected to a greater extent in the degree of similarity of the overall file, it is possible to adaptively support a file of any format. Further, since degree of similarity can be calculated for all areas, it is also possible to find partially matching documents.

If the result of retrieval processing at step S406 is that original electronic files having a high degree of similarity could be found, then thumbnail images or the like are displayed (step S407). If it is necessary for the operator to make a selection from a plurality of original electronic files, the original electronic file is specified by an input operation performed by the operator.

It should be noted that if the candidate is a single file, then control branches automatically from step S408 to step S413, where the storage address is reported. If an original electronic file is not found through the retrieval processing of step S406, or if the file is found but is a so-called image file typified by a PDF or tiff, then control branches from step 408 to step S409.

Processing for a conversion from an image to vector data is executed at step S409. For example, a text block that has undergone OCR processing at step S403 is subjected to character size, style and font recognition and a character code that is the result of OCR is vectorized using outline data that has been prepared beforehand for every character type (font category and style). With regard to a text block, the contour of a character image is identified and an outline vector along the contour of the character image is extracted, thereby vectorizing the text area. It may be so arranged that the result of OCR processing is stored beforehand as a character code corresponding to vector data of each character. Further, a table or figure block composed of lines is converted to an outline and if the figure shape, such as a table, can be recognized, then the shape is recognized. Furthermore, an image block is processed as a separate JPEG file by reason of the fact that it is image data. This vectorization processing is executed object by object, the layout information of each object is stored and is converted to an RTF (Rich Text Format) in which the vector data is embedded. By reading this with an application that is capable of handling the RFT-format file thus generated, text can of course be restored to a state in which it can be edited, and so can figures and image data. It should be noted that a converted data file for an application is not limited to the RTF format capable of embedding an object of vector data. For example, a conversion may be made to another file format such as the SVG (Scalable Vector Graphics) format.

Next, a classification-assist function is started up at step S410. This function is for rendering assistance as to which category of folder a document should be classified in and stored when documents are stored. This function makes it possible to greatly reduce the amount of work required of the user when documents are registered. A classification feature vector is generated from the text portion of a document and degrees of similarity are displayed in order starting from higher-order category folders based upon an evaluation of similarity with a classification feature vector that has been stored in an index. By thus displaying category folder candidates recommended as destinations for registration, the user can execute registration processing with ease. Furthermore, the user can also make a selection from category folders displayed as document registration destinations. In addition, the user can create a category folder not displayed or a new category folder and can store data, which has been converted as an electronic file, on the hard disk of the management personal computer 101 (step S411).

In order that the input image vectorized at step S409 can be retrieved as an original electronic file when similar retrieval processing is executed from this point onward, index generating processing similar to that of steps S308 to S311 described earlier is executed at step S412, whereby index information is generated and added onto an index file for search purposes.

In a case where an original electronic file could be specified from pointer information at step S418, a case where an original electronic file could be specified by the retrieval processing of step S408, and a case where a conversion to an electronic file could be made by vectorization and the file stored at steps S409 to S412, the storage address of the original electronic file is reported to the operator at step S413 in order that the operator can specify the original electronic file directly.

If it is determined at step S414 that processing desired by the operator is printing, then control branches to step S415, where the pointer information is appended to the file as image data.

By using as is the electronic file thus obtained, the document can be manipulated, stored, transmitted or printed at step S416. In this processing, the amount of data is reduced, storage efficiency enhanced and transmission time shortened in comparison with a case where image data is used. In addition, when a document is printed or displayed, the data is outstanding as high-quality data.

Billing processing conforming to the display method, access method and user processing of the retrieval results is executed at step S417 based upon copyright royalty information, which has been defined for every document, stored in the billing server 110-1 or 110-2.

Each processing step will now be described in detail. The block selection processing indicated at step S402 will be described first.

[Block Selection Processing (Area Segmentation Processing)]

Figure 5B:
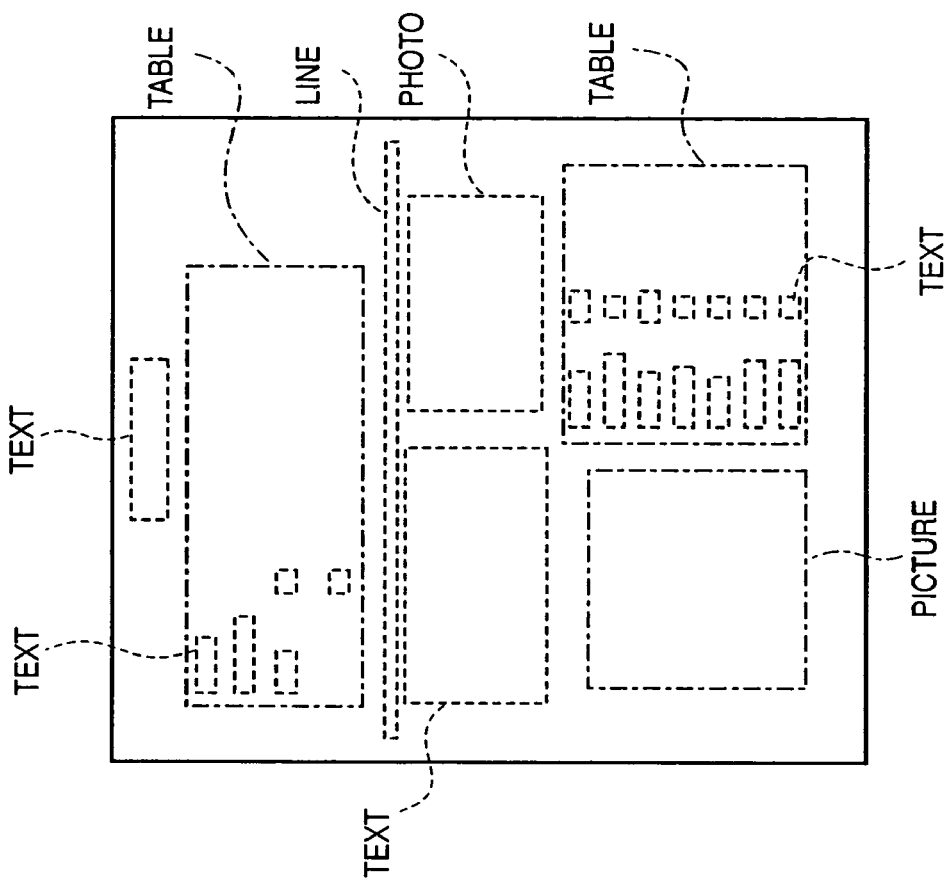
FIGS. 5A, 5B are diagrams illustrating an example of an input document.
Figure 5A:
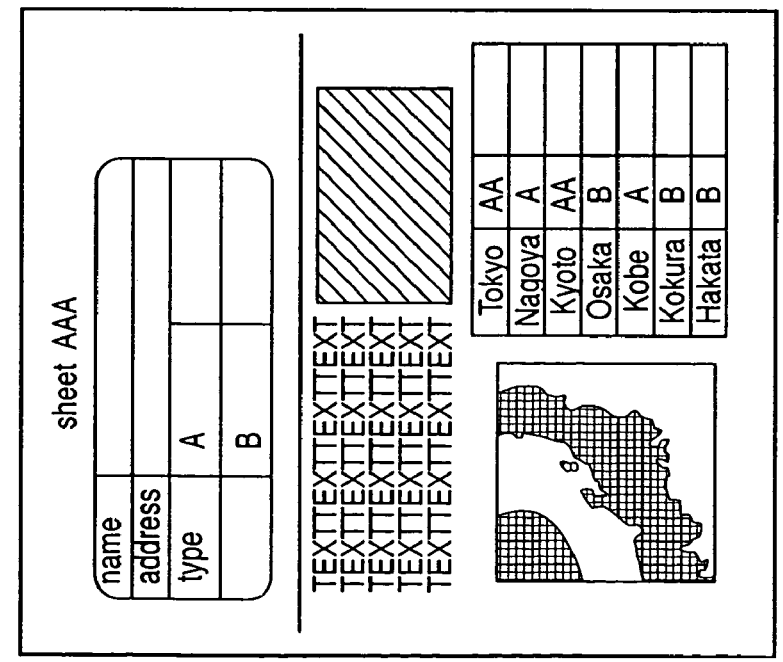

The block selection processing of step S402 will be described with reference to FIGS. 5A and 5B. FIG. 5A illustrates an example of one page of image data read at step S401, and FIG. 5B illustrates how this image data is recognized as pixel clusters on an object-by-object basis, how the attribute, e.g., text, picture photograph, line, table, etc., of each block is discriminated, and how the data is segmented into areas having different attributes.

An embodiment of block selection processing will now be described. First, an input image is binarized into a monochrome image and the contour of the image is traced to thereby extract a cluster of pixels bounded by an outline of black pixels. In clusters of black pixels of large area, white pixels within the cluster are also subjected to contour tracing to extract clusters of white pixels. Clusters of black pixels are further extracted recursively from within white-pixel clusters larger than a certain area.

Clusters of black pixels thus obtained are classified according to size and shape and are categorized into areas having different attributes. For example, clusters having as aspect ratio close to unity and a size that falls within a certain range are adopted as pixel clusters corresponding to characters, and portions in which closely adjacent characters can be grouped with good alignment are adopted as text areas (TEXT). Flat pixel clusters are adopted as line areas (LINE). A zone greater than a certain size and rectangular in shape and occupied by black-pixel clusters that envelop white-pixel clusters in good alignment is adopted as a table area (TABLE). Areas in which irregularly shaped pixel clusters are dispersed are adopted as photograph areas (PHOTO). Pixel clusters of any other shape are adopted as picture areas (PICTURE).

Block information for each block obtained by block selection processing is used as information for vectorization or retrieval processing, described below.

[Detection of Pointer Information]

Next, pointer information detection processing (step S404) for extracting a storage location of an original electronic file from image information will be described.

Figure 6:
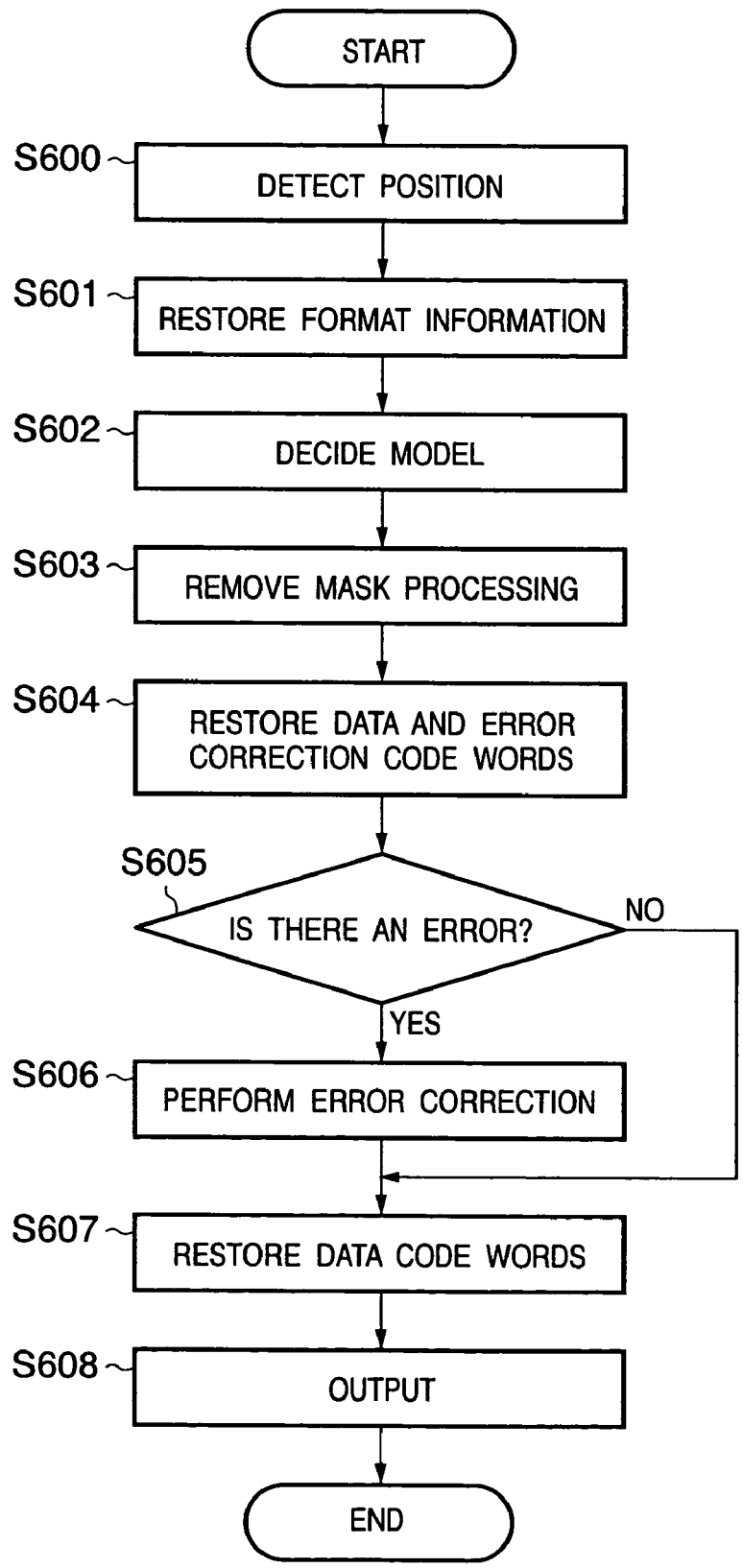
FIG. 6 is a flowchart illustrating the flow of pointer information detection processing.
Figure 7:
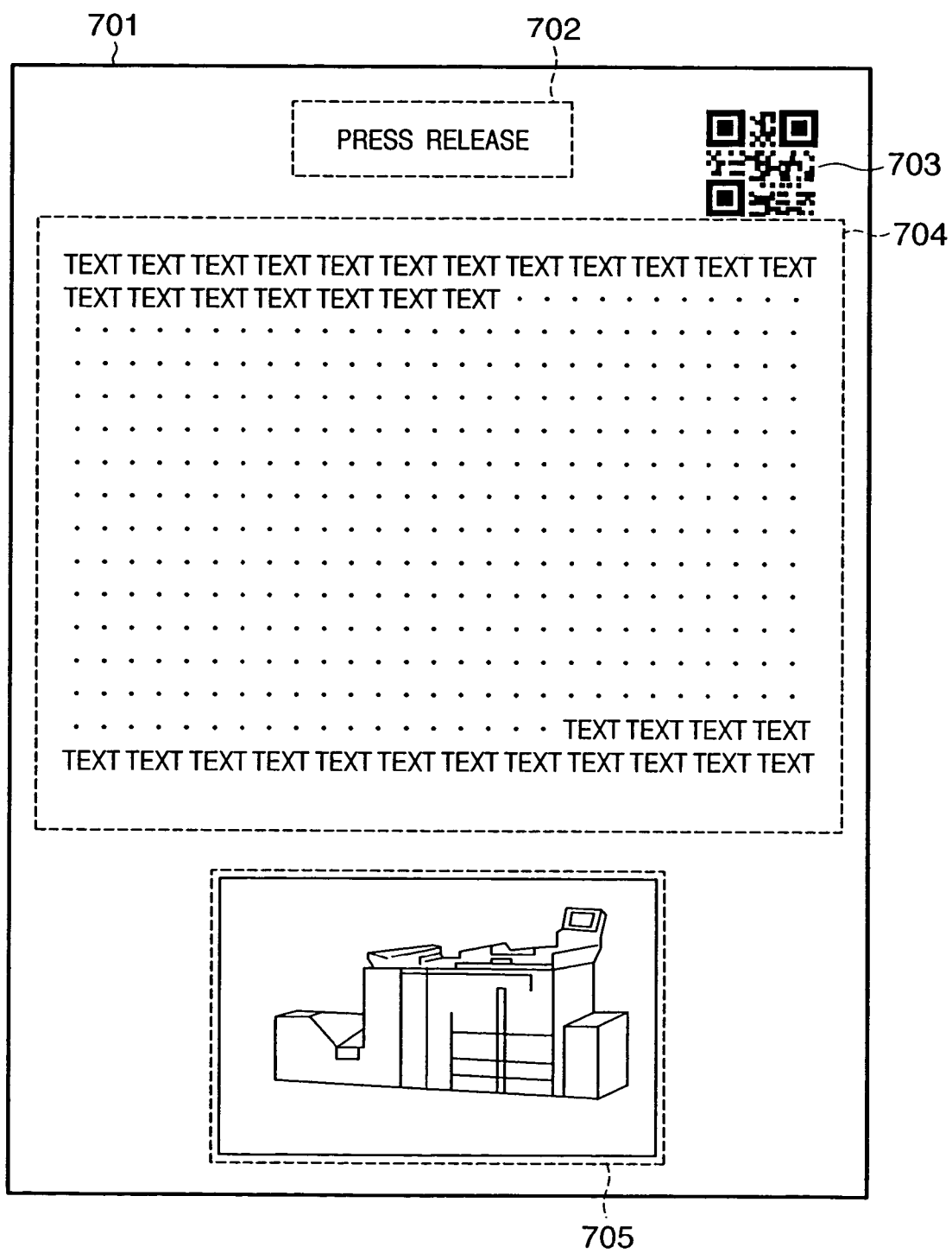
FIG. 7 illustrates an example of an input document used when pointer information is detected.

FIG. 6 is a flowchart illustrating a process for decoding a two-dimensional bar code (QR code symbol), which has been appended to an input image, and outputting a data character string. FIG. 7 illustrates an example of a document to which a two-dimensional bar coded has been appended.

First, an image representing a document 701 that has been stored in a page memory within the data processor 205 is scanned by a CPU (not shown) and the position of a prescribed two-dimensional bar code symbol 703 is detected (step S600) from the result of the block selection processing described earlier. The QR-code position detection pattern is composed of identical position detection element patterns disposed at three of the four corners of the symbol.

Next, format information adjacent the position detection pattern is restored and an error correction level, which has been applied to the symbol, and a master pattern are obtained (step S601).

After the symbol model is decided (step S602), the bit pattern of the encoded area is subjected to an exclusive-OR operation using the master pattern obtained from the format information, thereby removing mask processing (step S603).

Furthermore, a symbol character is read in accordance with a placement rule that corresponds to the model and message data and error correction code words are restored (step S604).

Whether there is an error on a restored code is detected (step S605). If an error is detected, processing branches to step S606 and the error is corrected.

Data code words are divided into segments (step S607) based upon mode indicators and character-count indicators of the error-corrected data.

Finally, data characters are decoded based upon specifications mode and the results are output (step S608).

It should be noted that data incorporated in a two-dimensional bar code represents address information of the corresponding original electronic file. For example, the data is composed of path information comprising a file server name and a file name, or an URL leading to the corresponding original electronic file.

This embodiment has been described in regard to the document 701 to which the pointer information has been appended by a two-dimensional bar code. However, in a case where pointer information is recorded directly as a character string, the block of a character string that is in conformity with a predetermined rule can be detected by the previous block selection processing and each character of the character string indicating the pointer information can be subjected to character recognition, thereby directly obtaining address information of the original electronic file.

Further, the character string of the text block 702 or 704 in the document 701 of FIG. 7 can be provided with pointer information by adding modulation to a degree that is difficult to see in the spacing between mutually adjacent characters and embedding information between these characters. If so-called watermark information is detected in the spacing between characters when character recognition processing (described below) is executed, then pointer information is obtained. It is also possible to add pointer information to a natural picture 705 in the form of an digital watermark.

[Retrieval of Original Electronic File Based Upon Pointer Information]

Figure 8:
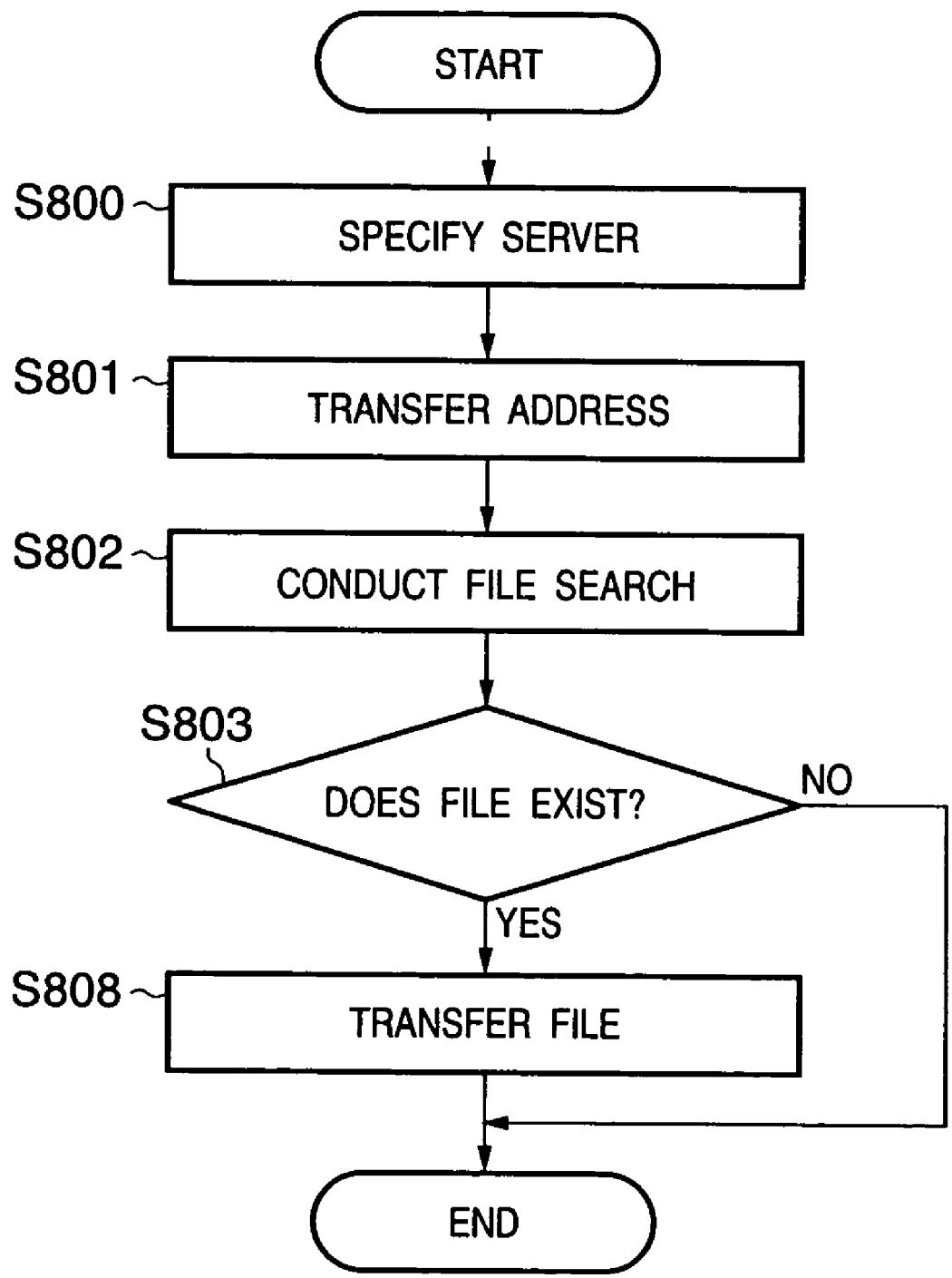
FIG. 8 is a flowchart illustrating the flow of processing in a case where a file search is conducted based upon pointer information.

Steps S405 and S418 in FIG. 4 will be described next. Processing for searching original electronic files from pointer information will be described with reference to the flowchart of FIG. 8.

A file server is specified based upon an address contained in pointer information (step S800). In this embodiment a file server signifies the hard disk within the management personal computer 101. However, if the storage destination of an original electronic file is the client personal computer 102, the database 105-1 or 105-2 of the document management server 106-1 or 106-2 or the storage device 201 in the MFP 100, then the file server would signify this destination. Further, an address is an URL or path information that comprises a server name and file name.

If a file server can be specified, an address is transferred to the file server (step S801). Upon receiving the address, the file server conducts a search for the original electronic file (step S802). If the original electronic file does not exist ("NO" at step S803), then this is reported to the MFP 100.

If the original electronic file does exist ("YES" at step S803), then, as described in FIG. 4, the address of the original electronic file is reported (step S413). If the processing desired by the user is acquisition of image file data, then the original electronic file is transferred to the MFP 100 (step S808).

[OCR Processing]

OCR processing (character recognition processing) at step S403 will be described next.

The character recognition unit subjects images that have been cut out in character units to recognition using a pattern matching technique and obtains the corresponding character codes. Recognition processing includes comparing an observation feature vector, which is the result of converting a feature obtained from a text image to a numerical-value sequence of several tens of dimensions, and a dictionary feature vector obtained in advance for every character type, and adopting the character type having the shortest distance as the result of recognition. Various well-known methods are available for extracting feature vectors. For example, one method is to divide text into meshes and adopt as a feature a vector the number of dimensions of which is the number of meshes, where this is obtained by counting character lines in each mesh as line elements according to direction.

In a case where character recognition is applied to a text area that has been extracted by block selection processing (step S402), first it is determined whether the writing in the area is horizontal or vertical, a line is cut out in each corresponding direction and then a character is cut out to obtain the character image. The determination of horizontal or vertical writing may be performed by taking a horizontal/vertical projection with respect to pixel values within the area, determining that an area is a vertical-writing area if the variance of the horizontal projection is large and determining that an area is a horizontal-writing area if the variance of the vertical projection is large. Decomposition into character strings and characters is performed by cutting out a line by utilizing a projection in the horizontal direction in case of horizontal writing and cutting out characters from the projection in the vertical direction with respect to the line that has been cut out. With regard to a text area of vertical writing, it will suffice to reverse the horizontal and vertical directions. At this time character size can be detected.

[File Search]

The details of file retrieval processing at step S406 in FIG. 4 will be described with reference to FIG. 10.

The file search is conducted utilizing information of each block obtained through segmentation by the above-described block selection processing (step S402). More specifically, use is made of compound retrieval that combines a comparison between the attribute of each block and block coordinate information in the file, namely a comparison based upon the layouts, and a comparison of internal information of every block to which is applied a comparison method that differs depending upon the attribute of each block in the file.

Figure 10:
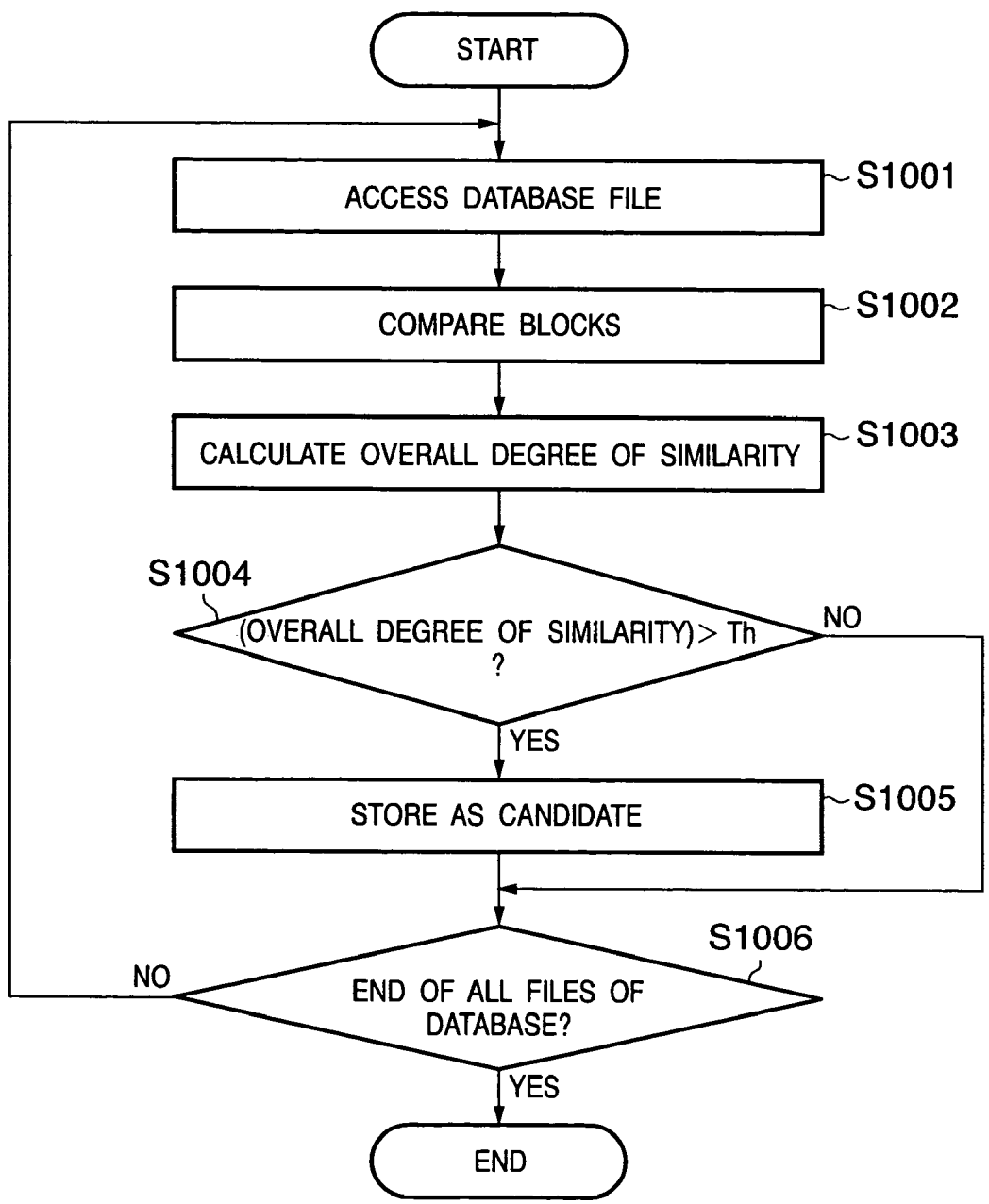
FIG. 10 is a flowchart illustrating the flow of processing in a case where file retrieval processing based upon degree of similarity is conducted.

FIG. 10 is a flowchart for comparing the input file, which has undergone block selection processing at step S406 in FIG. 4, successively with search indices of original electronic files already stored and retrieving a matching original electronic file. First, the original electronic file is accessed from a database (step S1001). Each block of the input file and each block of the original electronic file are compared and the degree of similarity with the blocks of the original electronic file is obtained for every block of the input file (step S1002).

Figure 9:
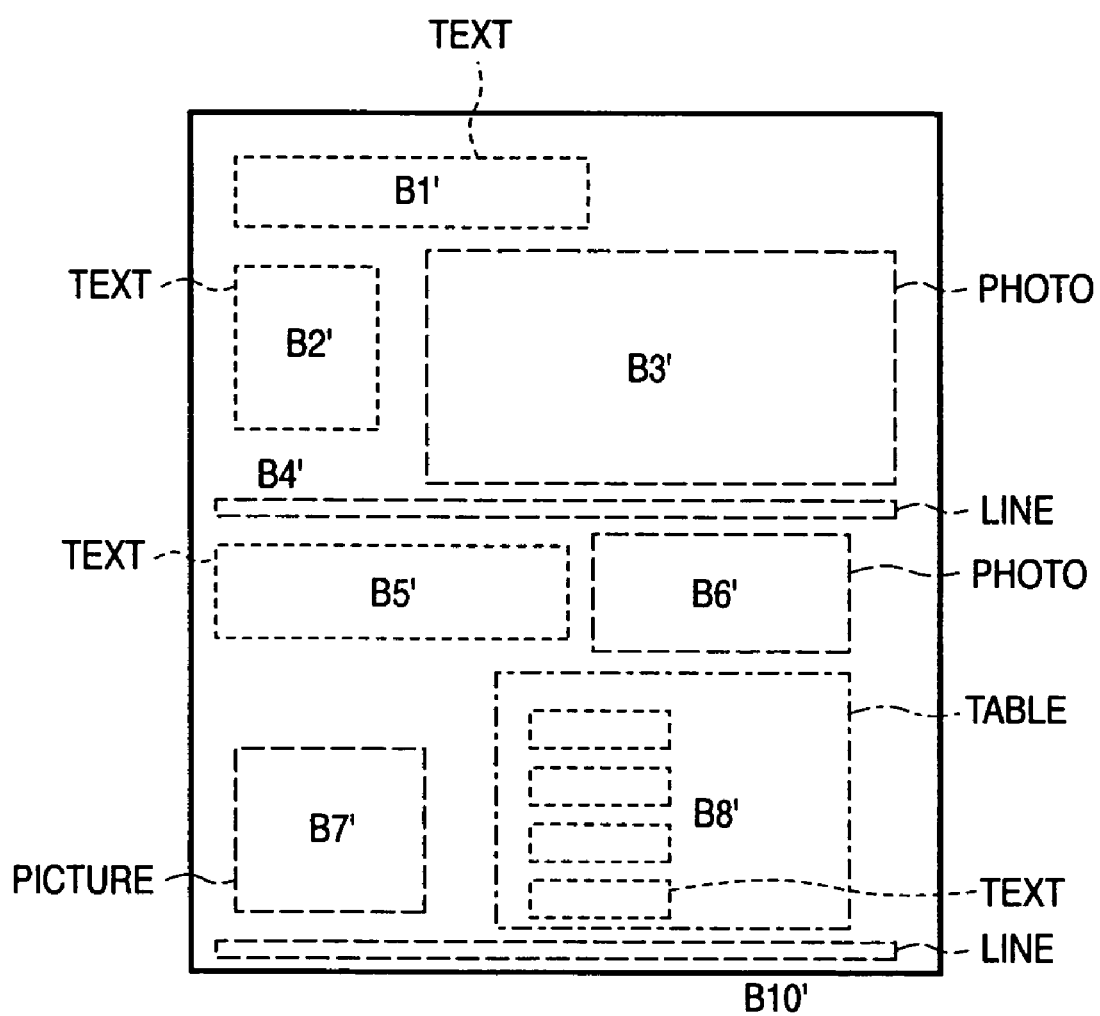
FIG. 9 is a diagram illustrating results obtained when the input document shown in FIG. 5 is subjected to block selection.
Figure 11:
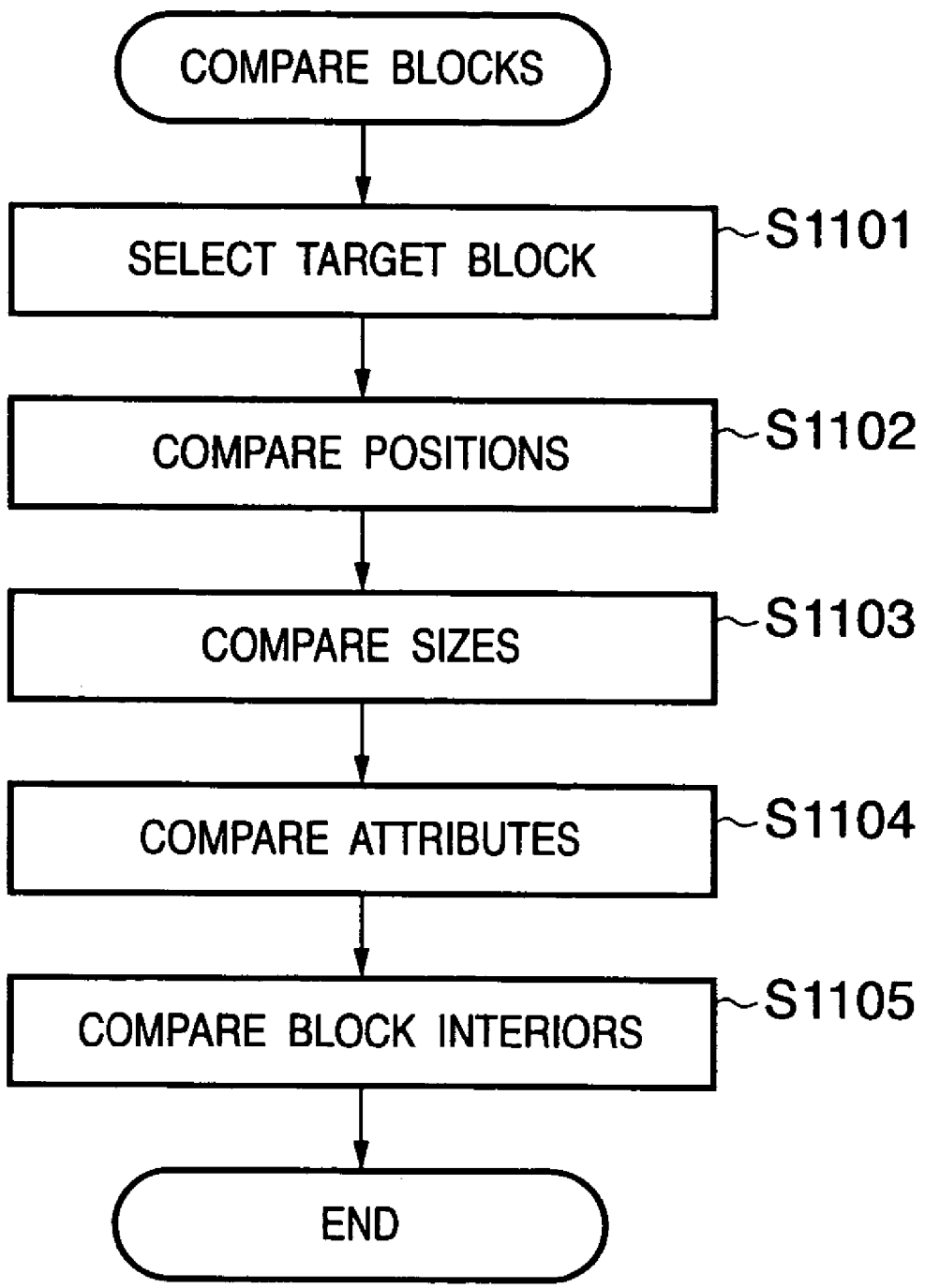
FIG. 11 is a flowchart illustrating the details of block comparison processing in file retrieval processing based upon degree of similarity.
Figure 12:
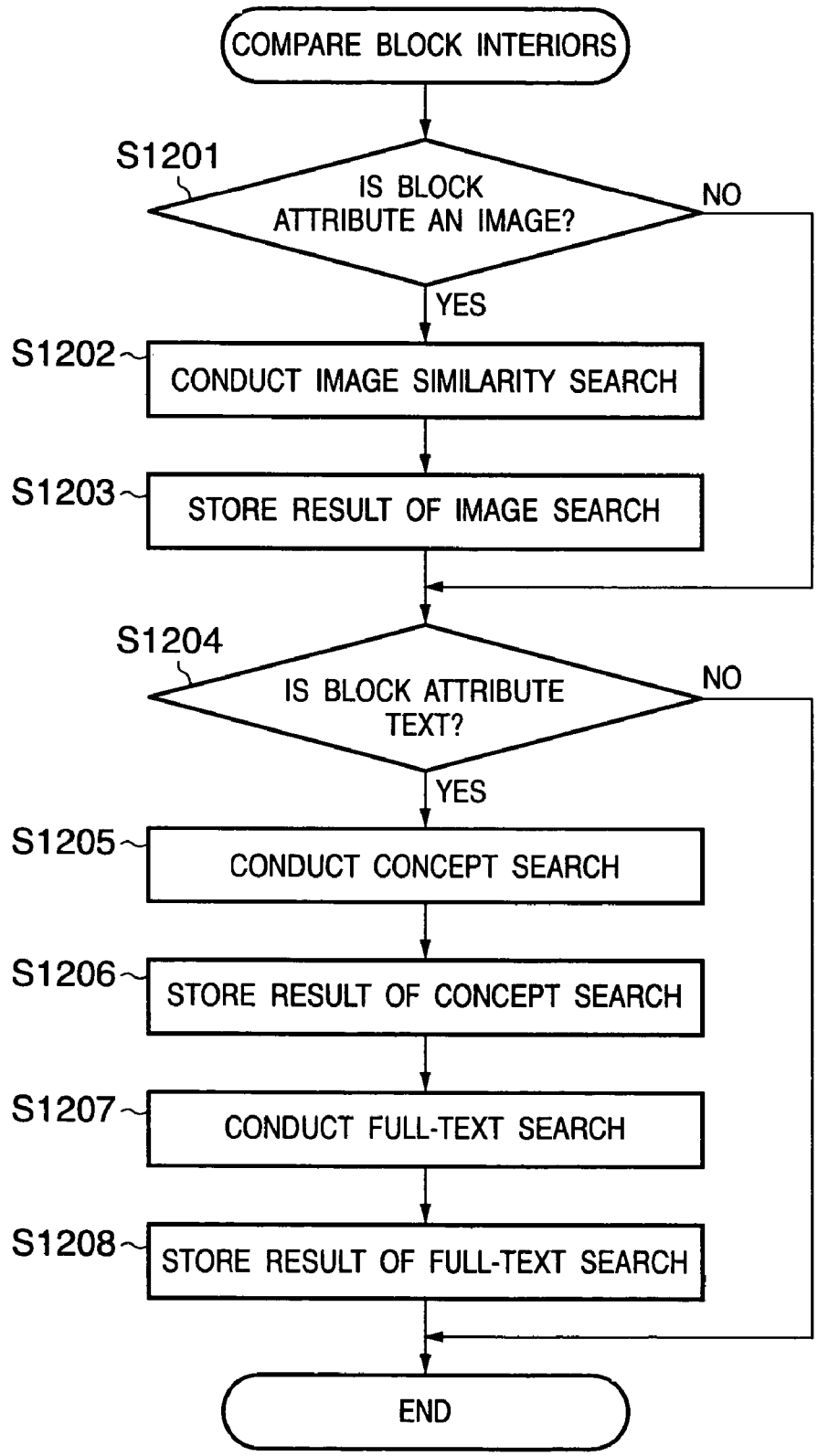
FIG. 12 is a flowchart illustrating in detail a comparison of information within blocks in block comparison processing.

The block comparison performed at step S1002 will be described in detail with reference to FIG. 5A and FIGS. 9, 11 and 12. FIG. 5A is assumed to be the input file, and an example of an original electronic file is illustrated in FIG. 9. The original electronic file shown in FIG. 9 has been segmented into blocks B'1 to B'9 and each block has been vectorized. FIG. 11 is a flowchart of processing for comparing one block in the input file with the original electronic file and calculating the degree of similarity. When the degree of similarity is calculated block by block, the first step is to select the target block of the original electronic file assumed to match the particular block of the input file in terms of layout. In this processing the target block of the original electronic file may be selected redundantly in regard to a plurality of blocks of the input file. Next, degree of similarity between layout information of the particular block and the layout information of the target block is obtained. Block positions, sizes and attributes are compared (steps S1101, S1103, S1104) and the degree of similarity of the layouts is found from the error values obtained. A comparison of block interiors is performed next. When the interiors of blocks are compared, these are compared as identical attributes. If attributes differ, therefore, pre-processing such as re-vectorizing one of the blocks to the matching attribute is executed. Comparison of the interiors of blocks is performed with regard to the block of the input file and the target block of the original electronic file handled as the same attribute by pre-processing (step S1105). In the comparison of block interiors, a comparison method best suited to the block attribute is adopted and therefore the comparison technique will differ depending upon the attribute. FIG. 12 is a flowchart describing a method of block-by-block comparison. For example, blocks are divided into attributes such as text, photographs, tables and line art by the block selection processing described above. If a block to be processed is a photographic image block ("YES" at step S1201), degree of similarity is calculated from error in terms of feature space based upon a feature vector extracted from the image (step S1202). A plurality of examples of feature vectors that can be mentioned here are a feature relating to color such a color histogram or color moment, a texture feature expressed by a co-occurrence matrix, contrast, entropy or a Gabor transform, and a shape feature such as a Fourier descriptor. An optimum combination of these plurality of features is used. The retrieval results (a list of candidates arranged in order of degree of similarity) is stored in a prescribed storage device, e.g., the storage device of the management personal computer 101.

In case of a text block ("YES" at step S1204), character codes are discriminated by OCR processing and therefore a summary is generated at step S1204 and a concept search is conducted. The retrieval results are stored in the storage device at step S1206. Keywords are then extracted at step S1207 and a full-text search is conducted. The retrieval results are stored in the storage device (step S1208).

Degree of similarity of block position, size, attribute and block interior is thus calculated and the degrees of similarity are totaled to make possible the calculation of the degree of similarity to the particular block of the input file. This degree of similarity of the block is recorded. This series of processing operations is repeated with regard to all blocks of the input file. The degrees of similarity of the blocks thus found are all combined to find the degree of similarity of the input file (step S1003).

Processing for calculating overall degree of similarity (step S1003) will be described next. Assume that similarity degrees n1, n2, ... of respective ones of the blocks in the input file of FIG. 5A have been calculated. Overall similarity degree N of the entire file is expressed by the following equation:

$$N = w1 \times n1 + w2 \times n2 + \ldots + \gamma \quad (1)$$

where w1, w2, ... represent weighting coefficients for evaluating the degree of similarity of each block. Further, γ represents a correction term which, by way of example, is assumed to be the evaluation value of a block that was not selected as a target block of the original electronic file of FIG. 9 with respect to the input file. The weighting coefficients w1, w2, ... are found from the share of a block in a file. For example, if S1 represents the size of a block 1, share w1 of block 1 is calculated as follows:

$$w1 = S1/(\text{sum of the sizes of all blocks}) \quad (2)$$

By executing weighting processing using the share, the degree of similarity of a block that occupies a large area of a file is reflected to a greater extent in the degree of similarity of the overall file.

If the result of retrieval is that the degree of similarity is greater than a threshold value Th, then the degree of similarity is stored as a candidate (step S1005). Original electronic files are displayed as thumbnails or the like (step S407). If it is necessary for the operator to make a selection from a plurality of original electronic files, the original electronic file is specified by an input operation performed by the operator.

[Processing for Conversion to Application Data]

Figure 13:
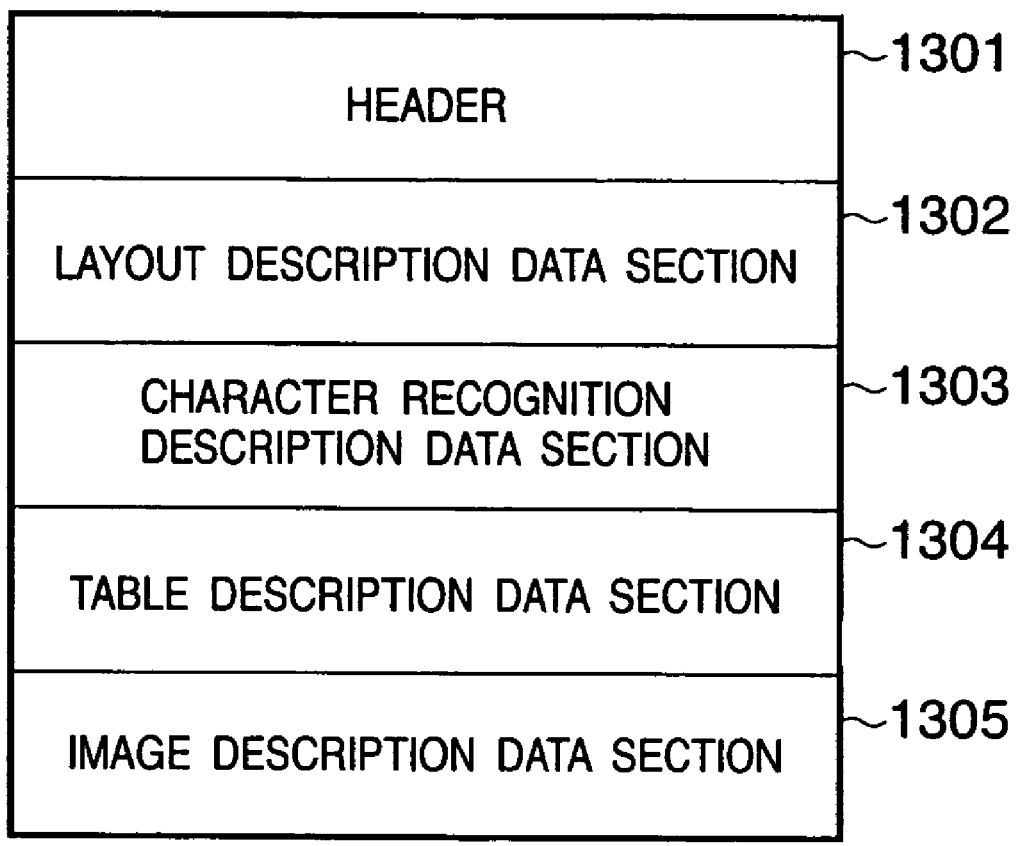
FIG. 13 is a diagram illustrating the data structure of a Document Analysis Output Format (DAOF)

One page of image data is subjected to block selection processing (step S402) and the result of applying vectorization processing (step S408) is converted as a file in an intermediate data format of the kind shown in FIG. 13. This data format is referred to as a Document Analysis Output Format (DAOF).

FIG. 13 is a diagram illustrating the data structure of the DAOF. As shown in FIG. 13, the DAOF includes a header 1301, which holds information relating to an input file to be processed. A layout description data section 1302 holds attribute information and rectangle address information of each block recognized for every attribute in the input file such as TEXT, TITLE, CAPTION, LINE ART, PICTURE, FRAME and TABLE. A character recognition description data section 1303 holds results of character recognition obtained by applying character recognition to TEXT blocks such as TEXT, TITLE and CAPTION. A table description data section 1304 stores the details of the structure of a TABLE block. An image description data section 1305 cuts out image data of a block such as PICTURE or LINE ART from the input file.

There are also cases where such a DAOF is stored not only as intermediate data but also upon being put into file form itself. In the file state, however, individual objects cannot be reutilized by a so-called general document creating application. Next, processing for effecting a conversion from this DAOF to application data (step S409) will be described.

Figure 14:
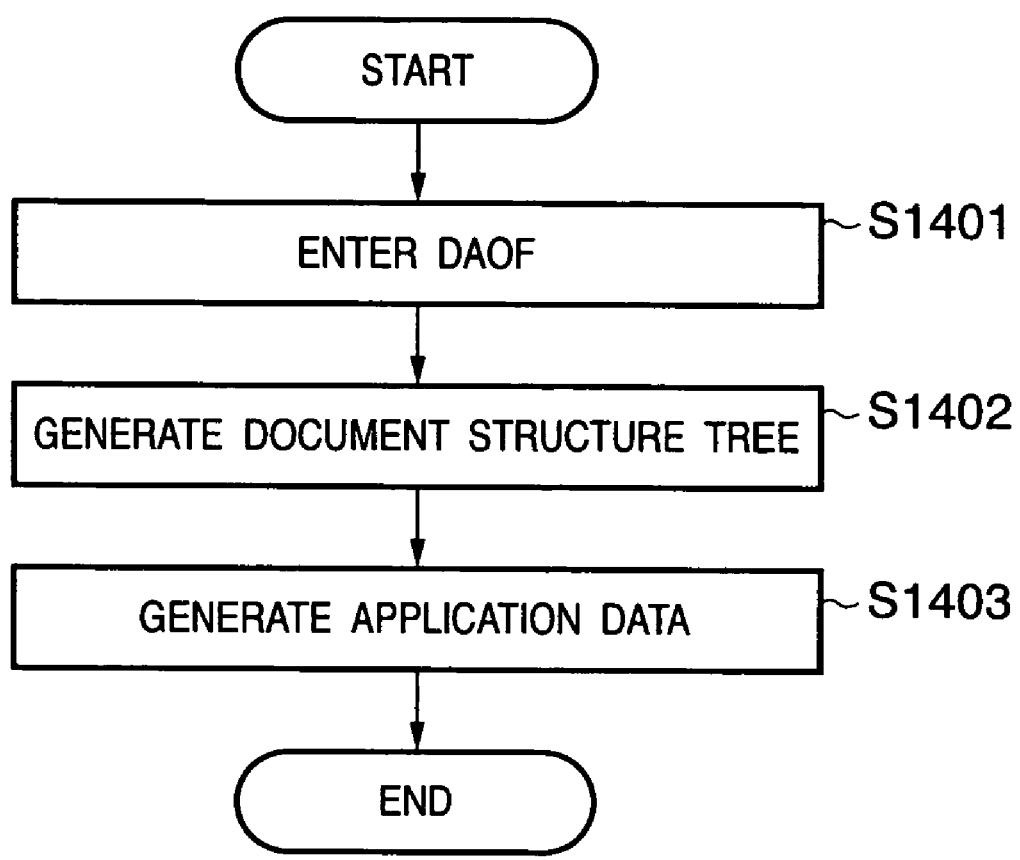
FIG. 14 is a flowchart illustrating processing for performing a conversion to application data.

FIG. 14 is a flowchart illustrating in detail the flow of processing (step S409) for effecting a conversion to application data.

The DAOF data is input at step S1401. A document structure tree that is the basis of application data is generated at step S1402. The actual data in the DAOF is read in and the actual application data is generated based upon the document structure tree at step S1403.

Figure 15:
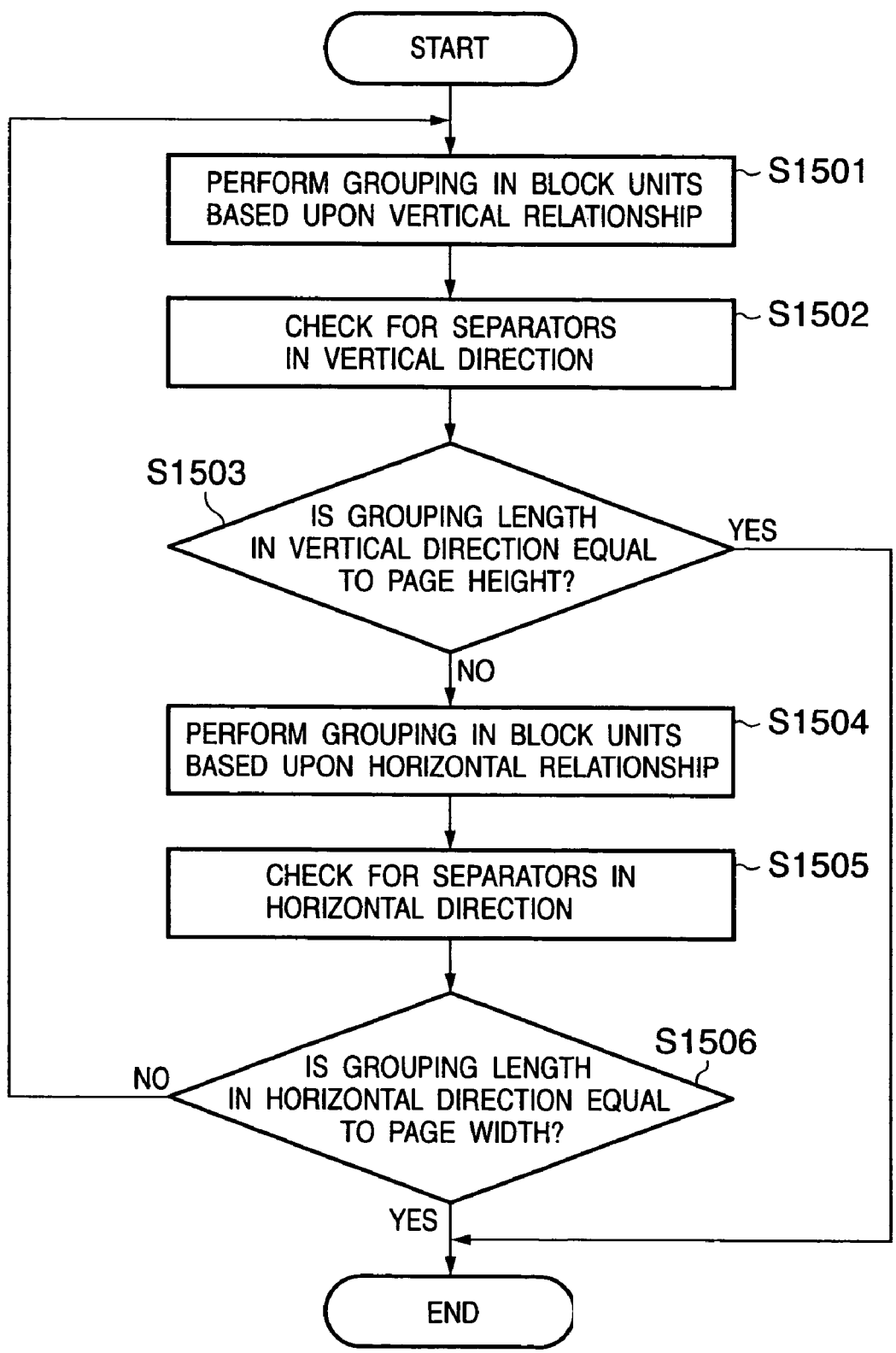
FIG. 15 is a flowchart illustrating processing for generating a document structure tree.
Figure 16A:
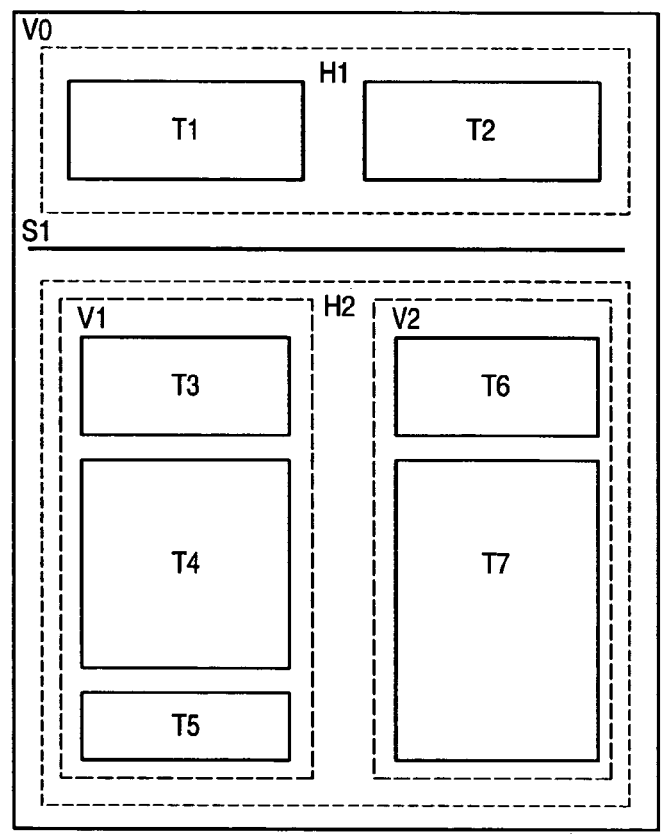
FIGS. 16A and 16B are diagrams illustrating the structure of a document structure tree.
Figure 16B:
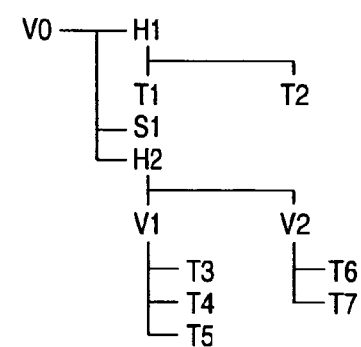

FIG. 15 is a flowchart illustrating in detail the flow of processing (step S1401) for generating a document structure tree. FIGS. 16A and 16B are diagrams useful in describing the structure of a document structure tree. The flow of processing undergoes a transition from a microblock (a single block) to a macroblock (a set of blocks) as a basic rule of overall control.

A block hereinafter signifies a microblock and the entirety of a macroblock. Regrouping is performed in block units at step S1501 based upon a relationship among the blocks in the vertical direction. After the start of processing, determination is performed in microblock units.

The relationship mentioned here can be defined to mean that distance between blocks is short and block width (height in the case of the horizontal direction) is substantially the same.

Further, information such as distance, width and height is extracted by referring to the DAOF. FIG. 16A illustrates actual page organization and FIG. 16B is the document structure tree thereof. As a result of the processing at step S1501, T3, T4 and T5 are generated as one group V1, and T6, T7 are generated as one group V2, which is a group of the same hierarchical layer.

Whether or not a separator is present in the vertical direction is checked at step S1502. Physically speaking, a separator is an object having a line attribute in the DAOF. In logical terms, a separator is an element that clearly divides a block in the application. If a separator is detected, then a block is re-divided at the same layer.

Whether or not divisions greater than above can exist is determined utilizing group length at step S1503. If group length in the vertical direction is equal to the page length (the distance between the uppermost and lowermost edges of a plurality of blocks present on the page), then generation of the document structure tree is terminated.

In the case of FIG. 16A, there is no separator between groups V1 and V2 and the group height is not the page height. Control therefore proceeds to step S1504. Here regrouping is performed in block units based upon a relationship in the horizontal direction. Here also the first operation immediately after start-up is to perform a determination in microblock units. The definitions of relationship and determination information are the same as those for the vertical direction.

In the case of FIG. 16A, H1 is generated as a group composed of T1, T2, and H2 is generated as a group composed of V1, V2. The group H1 is of the same hierarchical layer and is one layer above the group H2.

Whether or not a horizontal separator is present is checked at step S1505. In FIG. 16A, S1 is a horizontal separator and therefore this is registered in the tree and a layer composed of H1, S1, H2 is generated.

Whether or not divisions greater than above can exist is determined utilizing group length at step S1506. If group length in the horizontal direction is equal to the page width, then generation of the document structure tree is terminated. If this is not the case, then control returns to step S1501 and processing from the checking of relationship in the vertical direction is repeated in the layer that is one rank higher.

In the case of FIG. 16A, division width is page width and therefore tree generation is terminated. Finally, V0 of the uppermost layer representing the overall page is added to the document structure tree. After the document structure tree is completed, generation of application data is generated at step S1402 based upon this information.

In the case of FIG. 16A, the details are as follows: In FIG. 16A, H1 has the two blocks T1 and T2 in the horizontal direction and therefore is composed of two columns. After the internal information of T1 (text, image, etc., which is the result of character recognition with reference to the DAOF) is output, the column is changed and the internal information of T2 is output, after which S1 is output.

Further, H2 has the two blocks V1 and V2 in the horizontal direction and therefore is output as two columns. In block V1, the internal information is output in the order T3, T4, T5, after which the column is changed and the internal information of T7, T7 in V2 is output. Processing for effecting the conversion to application data can be executed by the operation above.

[Adding on Pointer Information]

Next, the processing of step S415 for adding on pointer information will be described. If a document to be processed has been identified by retrieval processing, or if an original electronic file could be reproduced by vectorization and this document is subjected to print processing, pointer information is added on when printing is performed on paper. As a result, when various processing is executed again using this document, the original electronic file can be acquired in simple fashion.

Figure 17:
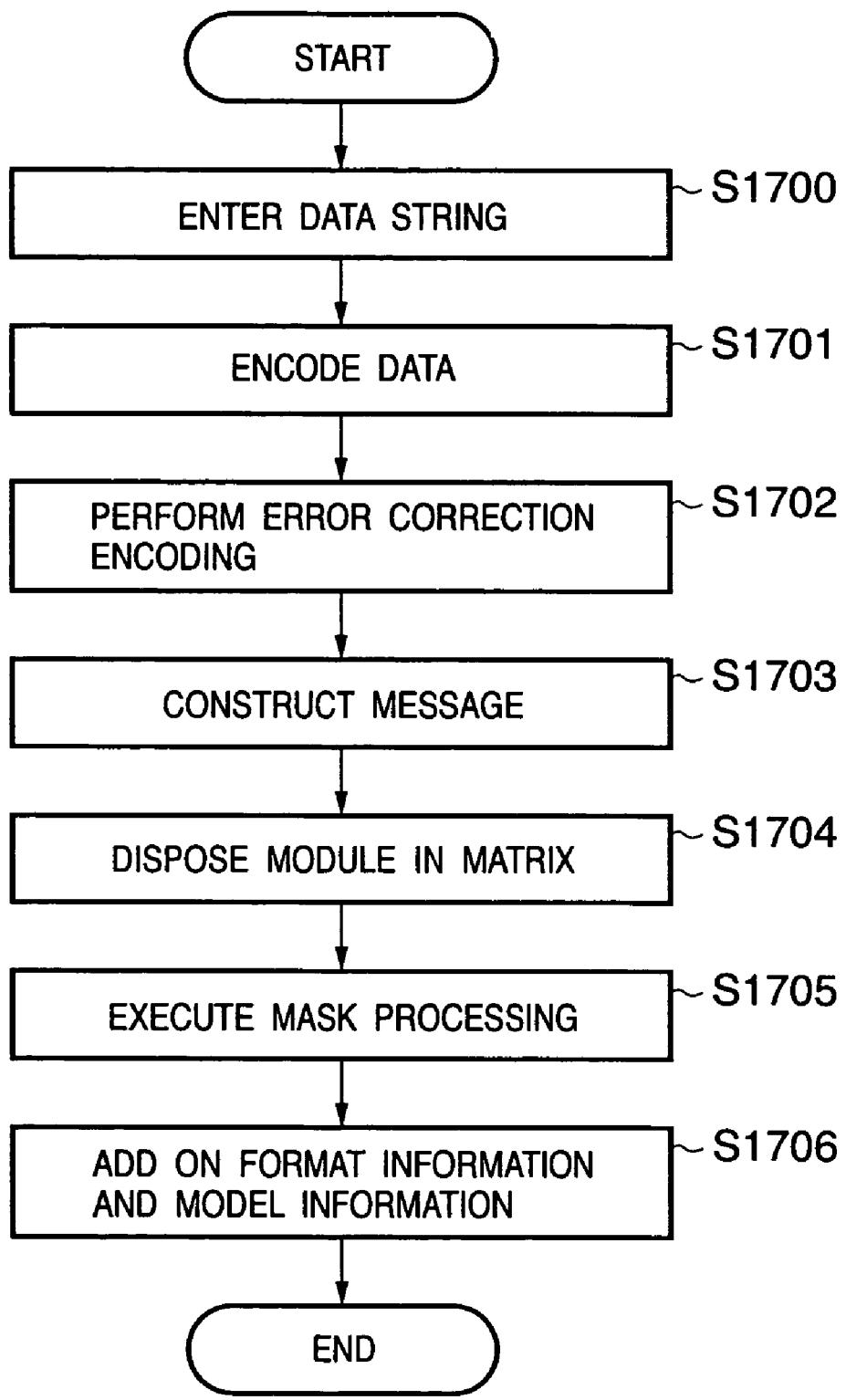
FIG. 17 is a flowchart illustrating processing for embedding pointer information.

FIG. 17 is a flowchart illustrating a process through which a data character string serving as pointer information is encoded in the form of a two-dimensional bar code (QR code symbol: JIS X0510) 701 and added to an image.

Data incorporated in the two-dimensional bar code represents the address information of the corresponding original electronic file. For example, the data is constituted by path information comprising a file server name and a file name. Alternatively, the data is constituted by an URL leading to the corresponding original electronic file or a file ID managed in the database in which the corresponding original electronic file has been stored or in a storage device possessed by the MFP 100 per se.

First, the input data string is analyzed in order to identify various different characters to be encoded. Further, error detection and error correction level are selected and the smallest model that can be accommodated by the input data is selected (step S1700).

Next, the input data string is converted to a prescribed bit string and an indicator, which represents the mode of the data (numeric, alphanumeric, 8-bit byte, kanji, etc.), or a termination pattern is added on as necessary. A further conversion is made to a prescribed bit code word (step S1701).

In order to perform error correction at this time, the code word string is divided into a prescribed number of blocks in accordance with the model and error correction level, an error correction code word is generated for every block and this is appended to the end of the data code word strin (step S1702).

The data code words of the blocks obtained at step S1702 are concatenated and an error correction code word of each block and, if necessary, a residue code word are appended (step S1703).

Next, a code word module is disposed in a matrix together with a position detection pattern, separation pattern, timing pattern and position combination pattern (step S1704).

Furthermore, the optimum master pattern is selected with regard to the symbol encoding area and a mask processing pattern is converted by an exclusive-OR operation to the module obtained at step S1704 (step S1705).

Finally, format information and model information is generated in the module obtained at step S1705, thereby completing the two-dimensional code symbol (step S1706).

In a case where an original electronic file is transmitted from, e.g., the client personal computer 102 as print data and formed on paper as a print image by the printing device 202, the above-described two-dimensional code in which address information has been incorporated is attached to the prescribed location on the raster data after it is converted to printable raster data in the data processor 205, as a result of which an image is formed. The paper on which the image has been formed is distributed to a user, and the user scans in the paper using the image reader 200, whereby the storage location of the original electronic file can be detected from the pointer information at step S404.

There are various means for applying additional information for a similar purpose. Besides the two-dimensional bar code described in this embodiment, means referred to generally as an digital watermark can be applied. Examples of methods are a method of adding pointer information to a document directly by a character string, a method of embedding information by modulating a character string in a document, particularly the spacing between characters, and a method of embedding information in a halftone image within a document.

[Processing for Checking Copyright at Billing Time]

Billing processing indicated at step S417 will be described next. This embodiment has been described on the assumption that all original electronic files accumulated thus far in a file server are freely accessible and the objects of an entire original electronic file or portion thereof can all be reutilized. However, there are occasions where input files to be processed include files whose reutilization by third parties should be limited. Described here will be the processing of step S417 for a case where input files include a file whose reutilization by third parties is limited.

Before executing processing such as printing of a document at step S416, an inquiry is made for copyright royalty information defined for every document and object accumulated in the billing servers 110-1, 110-2 in regard to an original electronic file that could be identified when original electronic files were searched from pointer information. Copyright royalty information is a correspondence table for billing a user according to method of displaying retrieval results, access method and user processing method. For example, the table describes content such as 100 yen for printing of an image area, 200 yen for copying of an image area, or the fact that a text portion is freely reutilizable.

The billing servers 110-1, 110-2 investigate the royalty information concerning the original electronic file and, if billing is necessary, request the MFP 100 to transmit the user ID and password.

The MFP 100 prompts the operator for the user ID and password and transmits the entered user ID and password to the billing servers.

The billing servers 110-1, 110-2 check the transmitted password and, if a match is obtained, permit the desired processing (utilization such as printing) at step S416 and execute the corresponding billing processing (step S417). Methods of authentication for performing billing are not limited to password-based methods. All authentication means can be used, such as widely used biological authentication (fingerprint authentication, etc.) and authentication by card.

Further, this embodiment is for a case where an original electronic file is specified by pointer information that has been added to a paper document. However, it is possible to execute similar processing also in a case where an original electronic file is specified by so-called retrieval processing indicated at steps S406 and S407 in FIG. 4.

Further, it may be so arranged that billing processing is executed also with regard to vectorization processing described at steps S409 to S412 in FIG. 4. That is, in a case where a fee is set when vectorization processing is executed from image information obtained by scanning a paper document, the cost incurred for performing vectorization processing is presented to the user before vectorization processing is executed. If a payment procedure (entry of user ID and password) is executed and authentication succeeds, vectorization processing is executed, thereby making it possible to collect the fee from the user. Further, it may be so arranged that when vectorization processing is executed, the cost required for performing vectorization processing and the cost required for managing copyright royalties thereafter may be combined to bill the user.

Second Embodiment

In the first embodiment described above, summary text is substituted into a concept search and keywords are substituted into a full-text search in a file search. However, in an environment in which processing capability is low, there are also cases where resources cannot be spared for the generation of summary text and keywords. In this case the entire text may be entered as the search key of a concept search and the full-text search may be omitted.

Third Embodiment

The first embodiment includes a process through which pointer information is detected and embedded. However, the usefulness of the present invention will not be lost even if processing is limited to compound retrieval processing without performing detection of pointer information.

Further, in accordance with the above embodiment, a rasterizing step is inserted before block selection. However, this is not essential. Further, index creation may be performed by scheduling and not at the time of a search. Though classification vector generation is performed whenever a document is input in the above embodiment, this may be performed whenever documents have been accumulated to a certain extent.

Further, in the embodiment above, a classification feature vector is generated whenever a document is input. However, this may be performed whenever documents have been accumulated to a certain extent. Further, though generation of a classification feature vector is performed using a text area it is possible to generate a classification feature vector also with regard to other attributes such as a table or image, and to perform generation of classification feature vectors overall based upon the area ratio of an image in a manner similar to that performed at the time of a search. Further, in the embodiment above, a recommended category folder is presented as the storage destination and the user is allowed to make the selection. However, an arrangement may be adopted in which a button for setting whether or not to perform automatic classification is provided. If such automatic selection is set by the user in advance, the first-ranked recommended category folder is registered automatically without choices being displayed.

Fourth Embodiment

Figure 18:
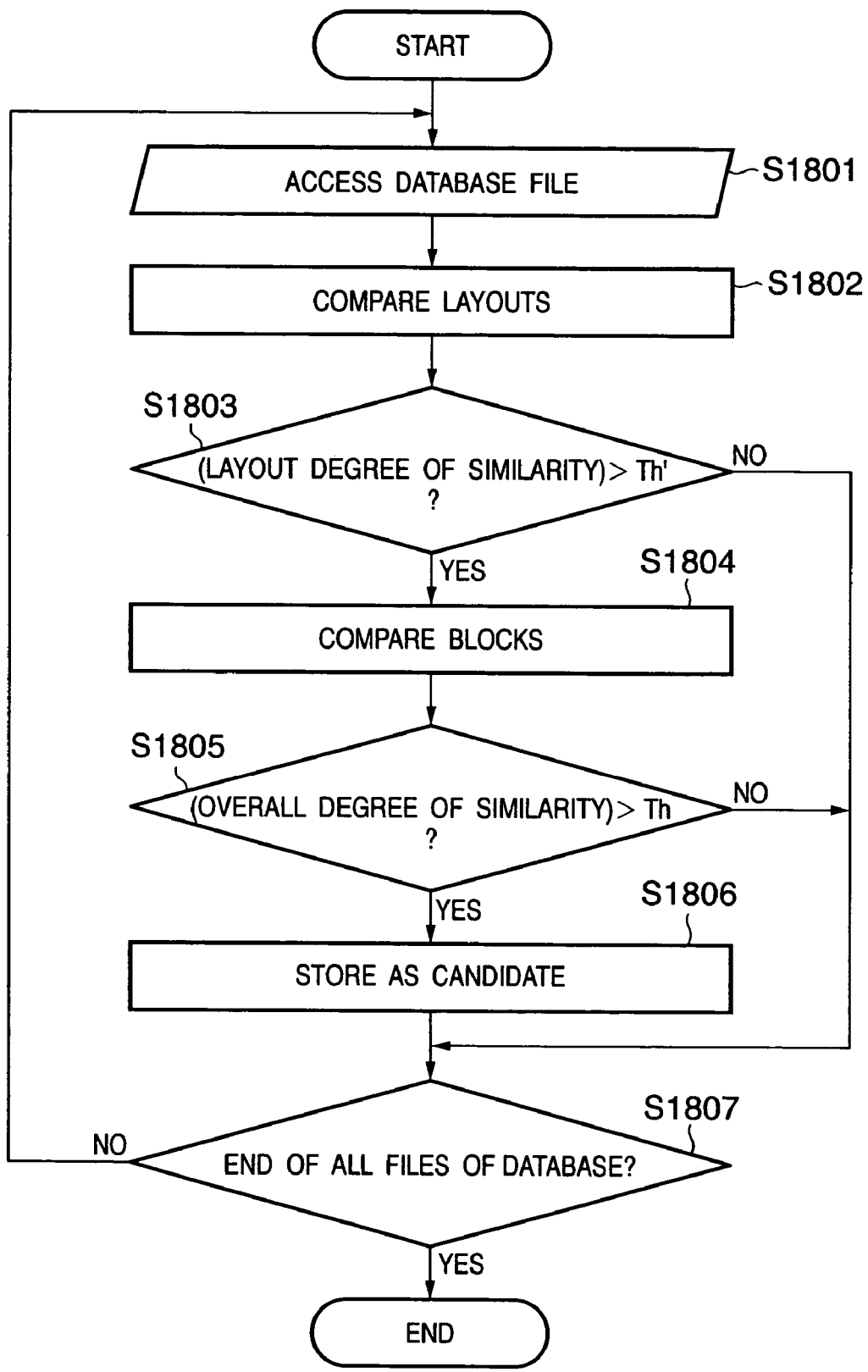
FIG. 18 is a flowchart illustrating file retrieval processing in a fourth embodiment of the present invention.

When an input file and database files are compared in a file search according to the first embodiment, a comparison is performed with regard to layout information and information within blocks in relation to all blocks of all input files. The fourth embodiment is such that if the layout of an input file and the layouts of database files are completely different, processing for making a comparison of information contained in blocks is omitted to reduce the amount of calculation in retrieval processing. FIG. 18 is a flowchart of a file search according to this embodiment. First, original electronic files are accessed from a database (step S1801). The position, size and attribute of each block of an input file are compared with each block of the original electronic file, the degree of similarity is found and the layout degree of similarity of the entire file is found (step S1802). It is determined at step S1803 whether the layout degree of similarity is greater than a predetermined threshold value. If it is found that the layout degree of similarity is equal to or less than the predetermined threshold value, then control proceeds to step S1807 without a comparison of information in blocks being executed. On the other hand, if the layout degree of similarity is found to be greater than the predetermined threshold value, then control proceeds to step S1804. Here a comparison of information contained in blocks is carried out and the overall degree of similarity of the entire file is obtained based upon the layout degree of similarity found and the degree of similarity of the information contained in the blocks. A technique for obtaining the overall degree of similarity from the degree of similarity of each block is processing similar to that of step S1003 in FIG. 10 and need not be described again here. It is determined at step S1805 whether the overall degree of similarity is greater than a predetermined threshold value. If the overall degree of similarity is greater than this predetermined threshold value, then the file that is the object of comparison is stored as a candidate (step S1806). On the other hand, if the overall degree of similarity is equal to or less than the predetermined threshold value, then the file is not adopted as a candidate. If there is a next database file that is the object of comparison, ("NO" at step S1807), control proceeds to step S1801. If there is no next file ("YES" at step S1807), then processing is terminated.

Since processing for obtaining the degree of similarity of information within blocks performs a comparison of blocks such as photograph blocks having a large quantity of information, the processing load generally is heavy in comparison with processing for comparing layout information. Accordingly, by narrowing down files to the extent that they are layout information, the amount of retrieval processing can be reduced and processing speed can be increased, thereby making it possible to retrieve a desired file more efficiently.

Fifth Embodiment

In a fifth embodiment, a file search is conducted at a higher precision by allowing the user to specify a block area that is a feature in a document, to specify a block that is to be excluded from the object of comparison and to specify a feature in a document.

Figure 19:
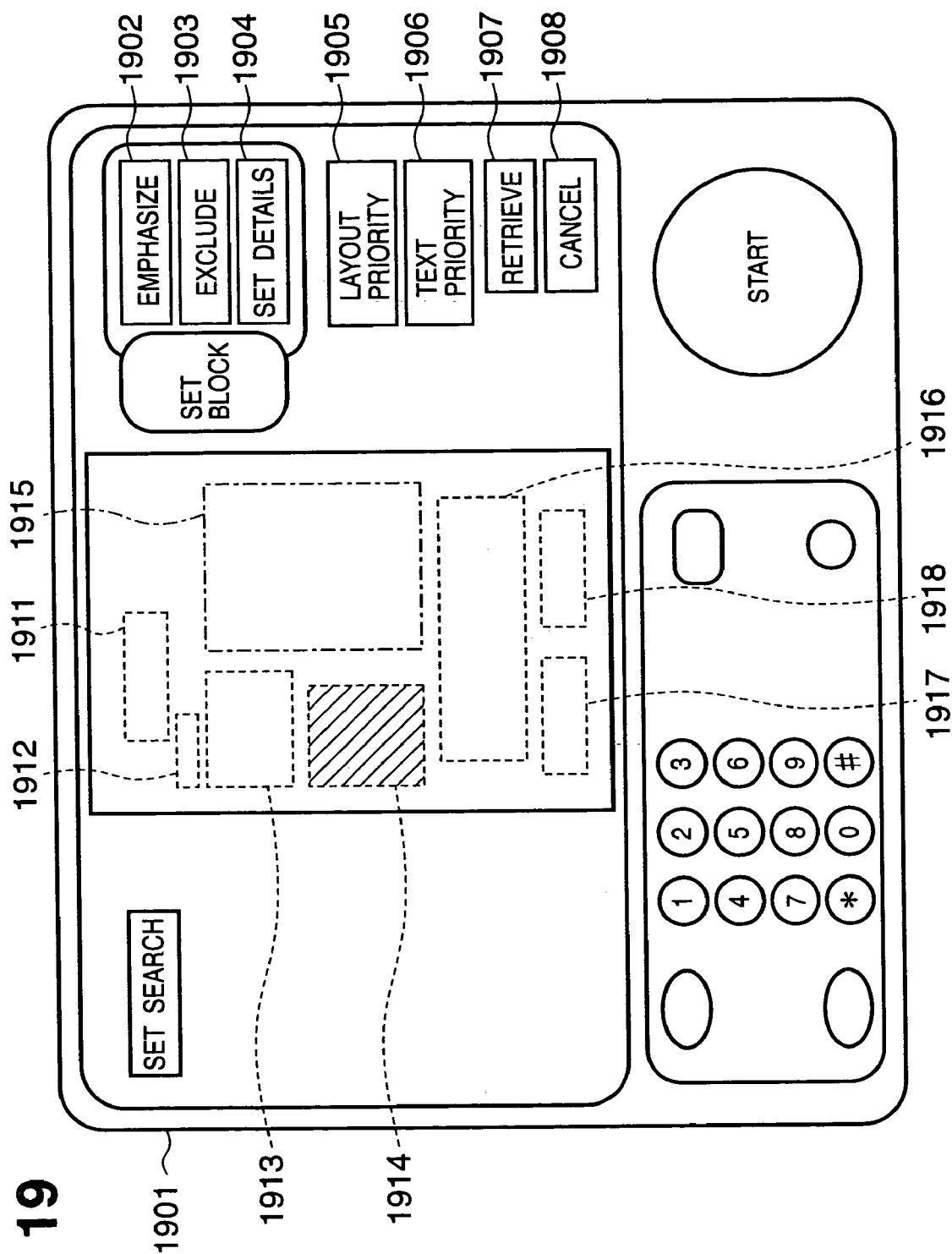
FIG. 19 illustrates a user interface screen for specifying search options.

FIG. 19 illustrates an example of a user interface screen (1901) for allowing the user to specify search options. An input file is divided into a plurality of blocks by block selection processing, and various block areas (1911 to 1917) in the file, such as text, photos, tables and line art, are displayed on the input screen.

The user selects a block that is a feature in the input file from among the blocks displayed and the user is allowed to specify a block to be emphasized. A plurality of blocks may be selected at this time. For example, when a button "EMPHASIZE" (1902) is pressed in a state in which block 1914 has been selected, retrieval processing that emphasizes block 1914 is executed. In Equation (1) for obtaining the degree of similarity of an overall file from the degree of similarity of every block in the file, this retrieval processing is realized by enlarging the weighting coefficient of the specified block 1914 and diminishing the weighting coefficients of the other blocks. If the "EMPHASIZE" button (1902) is pressed a plurality of times, the weighting coefficient of the selected block is enlarged further so that a search that emphasizes this block further can be executed.

Further, if an "EXCLUDE" button (1903) is pressed, retrieval processing is executed in a state in which the selected block 1914 is omitted. For example, in a case where an erroneous block has been extracted automatically, the user excludes this block to thereby omit needless retrieval processing and make it possible to prevent the acquisition of erroneous retrieval results. In a case where a block is excluded, it will suffice to adopt zero as the weighting coefficient of the relevant block in Equation (1).

Further, the attribute of a block can be changed by a "SET DETAILS" button (1904). By making it possible to revise the attribute of a block to the correct attribute, more accurate retrieval can be performed. Further, the "SET DETAILS" button makes it possible for the user to adjust more finely the retrieval priority weighting of a block. Thus, when a search is conducted, the user is allowed to specify and set the block that will be the feature, thereby optimizing the search.

A case in which a layout is a special layout also is conceivable depending upon the file. By selecting a "LAYOUT PRIORITY" button (1905) in relation to such a file, it is possible to conduct a file search that emphasizes layout. This can be achieved by applying weighting in such a manner that the result of degree of similarity of the layout is emphasized further.

Further, if a "TEXT PRIORITY" button (1906) is selected, then a search is conducted using only a text block and processing is reduced.

By thus allowing the user to select the features of an image, a search that emphasizes the features of a file can be conducted.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiments.

The present invention is not limited to the above embodiments and various changes and modifications can be made within the spirit and scope of the present invention. Therefore to apprise the public of the scope of the present invention, the following claims are made.

What is claimed is:

1. An image processing apparatus, including a computer-readable storage medium encoded with a computer program which is executable on a computer for retrieving retrieval-target image data that is similar to an entered document image, which operates as a scanner and a printer, comprising:
   a scanning unit for scanning a document and generating the entered document image;
   a segmentation unit for segmenting the entered document image and the retrieval-target image data into a plurality of areas on a per-attribute basis;
   an area specification unit for specifying an area to be emphasized of the plurality of areas segmented by said segmentation unit based on a user's instruction;
   a detection unit for detecting pointer information in a predetermined area of the plurality of areas of the entered document image, which indicates storage location in a storage device storing original image data of the entered document image;
   a first image data retrieving unit for retrieving the original image data of the entered document image based on the pointer information if the pointer information is detected by said detection unit; and
   a second image data retrieving unit for retrieving image data that is similar to the entered document image if the pointer information is not detected by the detection unit, including
   1) a layout-similarity calculation unit for calculating a layout degree of similarity, which is a degree of similarity between a layout of areas obtained by segmentation in the entered document image and a layout of areas obtained by segmentation in the retrieval-target image data, and
   2) a similarity calculation unit for calculating a degree of similarity, with regard to the retrieval-target image data for which the calculated layout degree of similarity is greater than a predetermined threshold value, for every area obtained by segmentation, using a comparison unit suited to the attribute; and
   an overall-similarity calculation unit for calculating an overall degree of similarity, with regard to the retrieval-target image data for which the calculated layout degree of similarity is greater than a predetermined threshold value, based on the degree of similarity calculated for every area obtained by segmentation and a weighting coefficient corresponding to the degree of similarity calculated for every area obtained by segmentation,
   wherein the weighting coefficient is calculated depending on a ratio between a sum of sizes of all segmented areas in the entered document image and each size of each segmented area in the entered document image, and is increased if the area corresponding to the weighting coefficient is the area specified by the area specification unit and decreased if the area corresponding to the weighting coefficient is not the area specified by the area specification unit, and
   wherein the entered document image is converted to vector data by a vector data conversion unit and registered as retrieval-target image data if the overall degree of similarity calculated by the overall-similarity calculation unit is lower than a predetermined threshold, and
   wherein said vector data conversion unit converts the document image to vector data in a case where an original data file corresponding to the entered document image could not be found based upon a result of calculation by said overall-similarity calculation unit; and
   a storage unit for storing the entered document image that has been converted to the vector data.

2. The apparatus according to claim 1, wherein said comparison unit includes:
   a unit for conducting a full-text search based upon text data extracted by character recognition from a text area among the areas obtained by said segmentation unit;
   a unit for conducting a concept search based upon the text data; and
   a unit for conducting an image search based upon a feature extracted from an image area among the areas obtained by said segmentation unit.

3. The apparatus according to claim 1, further comprising a communication unit for communicating with a server that stores information relating to a copyright royalty of each item of the retrieval-target image data;
   wherein the information relating to the copyright royalty being acquired with regard to the retrieval-target image data.

4. The apparatus according to claim 3, wherein in a case where the information relating to copyright royalty exists, no processing regarding the retrieval-target image data is executed as long as permission is not received from the server.

5. The apparatus according to claim 3, further comprising a billing unit for executing billing processing of a user that is based upon the copyright royalty.

6. The apparatus according to claim 1, further comprising:
   a billing unit for billing a user for a fee when the entered document image is converted to the vector data;
   the vector data conversion unit for converting the entered document image to the vector data in a case where a procedure for payment of the fee billed by said billing unit has been executed.

7. The apparatus according to claim 6, wherein said billing unit bills a fee when a copyright royalty of the entered document image that has been converted to the vector data is managed.

8. The apparatus according to claim 1, further comprising:
a candidate category output unit for outputting candidate categories of storage destinations based upon a feature of the entered document image that has been converted to the vector data.

9. The apparatus according to claim 8, further comprising:
a category selection unit for allowing a user to select a category of a storage destination from among the candidate categories of storage destinations that have been output by said candidate category output unit; and
a storage unit for storing the entered document image, which has been converted to the vector data, at the category of storage destination.

10. The apparatus according to claim 8, further comprising a storage unit for automatically storing the entered document image, which has been converted to the vector data, with respect to a first-ranked candidate category that has been output by said candidate category output unit.

11. The apparatus according to claim 8, wherein in a case where the original data file corresponding to the document image is an image file, said vector data conversion unit converts the document image to vector data.

12. The apparatus according to claim 1, further comprising a selection unit for allowing a selection of an area, which is used in calculation of degree of similarity, from among the plurality of areas obtained by segmentation by said segmentation unit;
wherein said similarity calculation unit calculates degree of similarity, using a comparison unit suited to the attribute, with regard to the area that has been selected by said selection unit.

13. An image processing method for retrieving retrieval-target image data that is similar to an entered document image, the method being used with an image processing apparatus that has a scanner and a printer, and comprising:
a scanning step of scanning a document and generating the entered document image, the scanning step being performed by the scanner;
a segmentation step of segmenting the entered document image and the retrieval-target image data into a plurality of areas on a per-attribute basis;
an area specification step of specifying an area to be emphasized of the plurality of areas segmented in said segmentation step based on a user's instruction;
a detection step of detecting pointer information in a predetermined area of the plurality of areas of the entered document image, which indicates storage location in a storage device storing original image data of the entered document image;
a first image data retrieving step of retrieving the original image data of the entered document image based on the pointer information if the pointer information is detected in said detection step; and
a second image data retrieving step of retrieving image data stored in the storage device that is similar to the entered document image if the pointer information is not detected in the detection step, including
1) a layout-similarity calculation step of calculating a layout degree of similarity, which is a degree of similarity between a layout of the areas obtained by segmentation in the entered document image and a layout of areas obtained by segmentation in the retrieval-target image data;
2) a similarity calculation step of calculating a degree of similarity, with regard to the retrieval-target image data for which the calculated layout degree of similarity is greater than a predetermined threshold value, for every area obtained by segmentation, using a comparison step suited to the attribute; and
an overall-similarity calculation step of calculating an overall degree of similarity, with regard to the retrieval-target image data for which the calculated layout degree of similarity is greater than a predetermined threshold value, based on the degree of similarity calculated for every area obtained by segmentation and a weighting coefficient corresponding to the degree of similarity calculated for every area obtained by segmentation,
wherein the weighting coefficient is calculated depending on a ratio between a sum of sizes of all segmented areas in the entered document image and each size of each segmented area in the entered document image, and is increased if the area corresponding to the weighting coefficient is the area specified in the area specification step and decreased if the area corresponding to the weighting coefficient is not the area specified in the area specification step, and
wherein a vector data conversion step for converting the entered document image to vector data and registered as retrieval-target image data stored in the storage device if the overall degree of similarity calculated in the overall-similarity calculation step is lower than a predetermined threshold, and
wherein said vector data conversion step converts the entered document image to the vector data in a case where an original data file corresponding to the document image could not be found based upon a result of calculation in said overall-similarity calculation step; and
a storage step for storing the entered document image that has been converted to the vector data.

14. The method according to claim 13, wherein said comparison step includes:
a step of conducting a full-text search based upon text data extracted by character recognition from a text area among the areas obtained at said segmentation step;
a step of conducting a concept search based upon the text data; and
a step of conducting an image search based upon a feature extracted from an image area among the areas obtained at said segmentation step.

15. The method according to claim 13, further comprising a communication step of communicating with a server that stores information relating to a copyright royalty of each item of the retrieval-target image data;
wherein the information relating to the copyright royalty being acquired with regard to the retrieval-target image data.

16. The method according to claim 15, wherein in a case where the information relating to the copyright royalty exists, no processing regarding the retrieval-target image data is executed as long as permission is not received from the server.

17. The method according to claim 15, further comprising a billing step of executing billing processing of a user that is based upon the copyright royalty.

18. The method according to claim 13, further comprising:
a billing step of billing a user for a fee when the entered document image is converted to the vector data;
wherein said vector data conversion step of converting the entered document image to vector data in a case where a procedure for payment of the fee billed at said billing step has been executed.

19. The method according to claim 18, wherein said billing step bills a fee when a copyright royalty of the entered document image that has been converted to the vector data is managed.

20. The method according to claim 13, further comprising:
a candidate category output step of outputting candidate categories of storage destinations based upon a feature of the entered document image that has been converted to the vector data.

21. The method according to claim 20, further comprising:
a category selection step of allowing a user to select a category of a storage destination from among the candidate categories of storage destinations that have been output at said candidate category output step; and
a storage step of storing the entered document image, which has been converted to the vector data, at the category of storage destination.

22. The method according to claim 20, further comprising a storage step of automatically storing the entered document image, which has been converted to the vector data, with respect to a first-ranked candidate category that has been output at said candidate category output step.

23. The method according to claim 20, wherein in a case where the original data file corresponding to the document image is an image file, said vector data conversion step converts the document image to the vector data.

24. The method according to claim 13, further comprising a selection step of allowing selection of an area, which is used in calculation of the degree of similarity, from among the plurality of areas obtained by segmentation at said segmentation step;
wherein said similarity calculation step calculates the degree of similarity, using a comparison step suited to the attribute, with regard to the area that has been selected at said selection step.

25. A storage medium storing a control program for execution by a computer to implement the image processing method set forth in claim 13.

* * * * *